(12) United States Patent
Le Taillandier De Gabory

(10) Patent No.: US 9,312,961 B2
(45) Date of Patent: Apr. 12, 2016

(54) OPTICAL OUTPUT DEVICE AND METHOD FOR CONTROLLING AN OPTICAL TRANSMITTER

(75) Inventor: Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/346,789

(22) PCT Filed: Mar. 2, 2012

(86) PCT No.: PCT/JP2012/001476
§ 371 (c)(1),
(2), (4) Date: Mar. 24, 2014

(87) PCT Pub. No.: WO2013/042284
PCT Pub. Date: Mar. 28, 2013

(65) Prior Publication Data
US 2014/0233963 A1    Aug. 21, 2014

(30) Foreign Application Priority Data

Sep. 22, 2011 (WO) .................. PCT/JP2011/005356

(51) Int. Cl.
*H04B 10/04* (2006.01)
*H04B 10/516* (2013.01)
*H04B 10/54* (2013.01)

(52) U.S. Cl.
CPC ............ *H04B 10/516* (2013.01); *H04B 10/541* (2013.01)

(58) Field of Classification Search
CPC ............. H04B 10/516; H04B 10/5561; H04B 10/564; H04B 10/548; H04B 10/556; H04B 10/5161; H04B 10/50575; H04B 10/5057; H04B 10/50572; H04B 10/50577

USPC ......... 398/182, 184, 185, 186, 187, 188, 192, 398/193, 194, 195, 196, 197, 198, 33, 38, 398/25, 30, 31, 32, 135, 136, 137, 138, 139, 398/158, 159, 183
See application file for complete search history.

(56) References Cited

U.S. PATENT DOCUMENTS 8,463,138 B2 *  6/2013  Sugihara et al. ............... 398/197
2003/0175037 A1  9/2003  Kimmitt et al.
(Continued)

FOREIGN PATENT DOCUMENTS

EP    1 975 693 A1    10/2008
JP    2008-249848 A   10/2008

OTHER PUBLICATIONS

Lynn E. Nelson et al., "Capabilities of Real-Time Digital Coherent Transceivers", European Conference on Optical Communications, ECOC 2010, Mo.1.C.5., Sep. 19-23, 2010.
(Continued)

*Primary Examiner* — Hanh Phan

(57) ABSTRACT

Since it is difficult to emit a control a IQ modulator emitting modulated lightwave according to QAM format without signal degradation of said emitted signal due to low frequency dither used for the control of said modulator, a method for controlling an optical transmitter according to an exemplary aspect of the invention includes: generating a multilevel electrical signal by means of combining two or more binary electrical signals, where said multilevel signal is used to drive the modulator of adding a low frequency dither signal on several of the binary electrical signals, wherein the phase of the added dither signal depends on the value of the binary signal to which it is added; tapping a portion of light after the modulator and generating a monitor signal from the tapped light; controlling the modulator according to the monitor signal.

14 Claims, 19 Drawing Sheets

(56) References Cited

U.S. PATENT DOCUMENTS

2005/0286902 A1* 12/2005 Pierce et al. .................. 398/139
2008/0187324 A1*  8/2008 Akiyama et al. .............. 398/188
2009/0324253 A1* 12/2009 Winzer .......................... 398/185

OTHER PUBLICATIONS

P. J. Winzer et al., "Generation and 1,200-km Transmission of 448-Gb/s ETDM 56-Gbaud PDM 16-QAM using a Single I/Q Modulator", ECOC 2010, PD2.2.

P. J. Winzer et al., "Spectrally Efficient Long-Haul Optical Networking Using 112-Gb/s Polarization-Multiplexed 16-QAM", Journal of Lightwave Technology, Feb. 15, 2010, vol. 28, No. 4, pp. 547-556.

A. H. Gnauck et al., "Generation and Transmission of 21.4-Gbaud PDM 64-QAM Using a High-Power DAC Driving a Single I/Q Modulator", Optical Society of America, 2011, OSA/OFC/NFOBC2011.

A. Konczykowska et al., "42GBd 3-bit power-DAC for optical communications with advanced modulation formats in InP DHBT", Electronics Letters, Mar. 17, 2011, vol. 47 No. 6.

International Search Report for PCT Application No. PCT/JP2012/001476, mailed on Jun. 6, 2012.

* cited by examiner

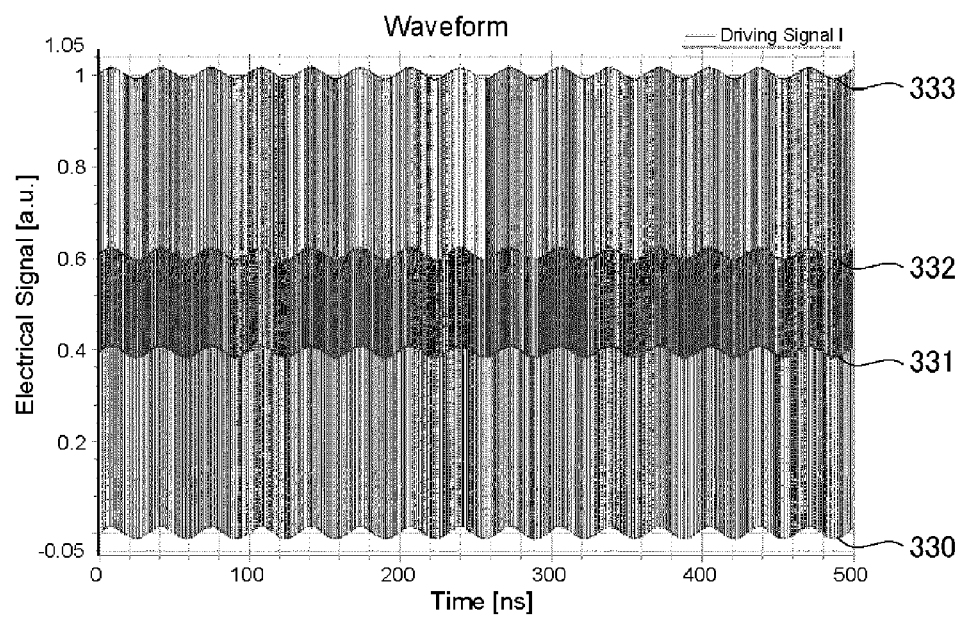

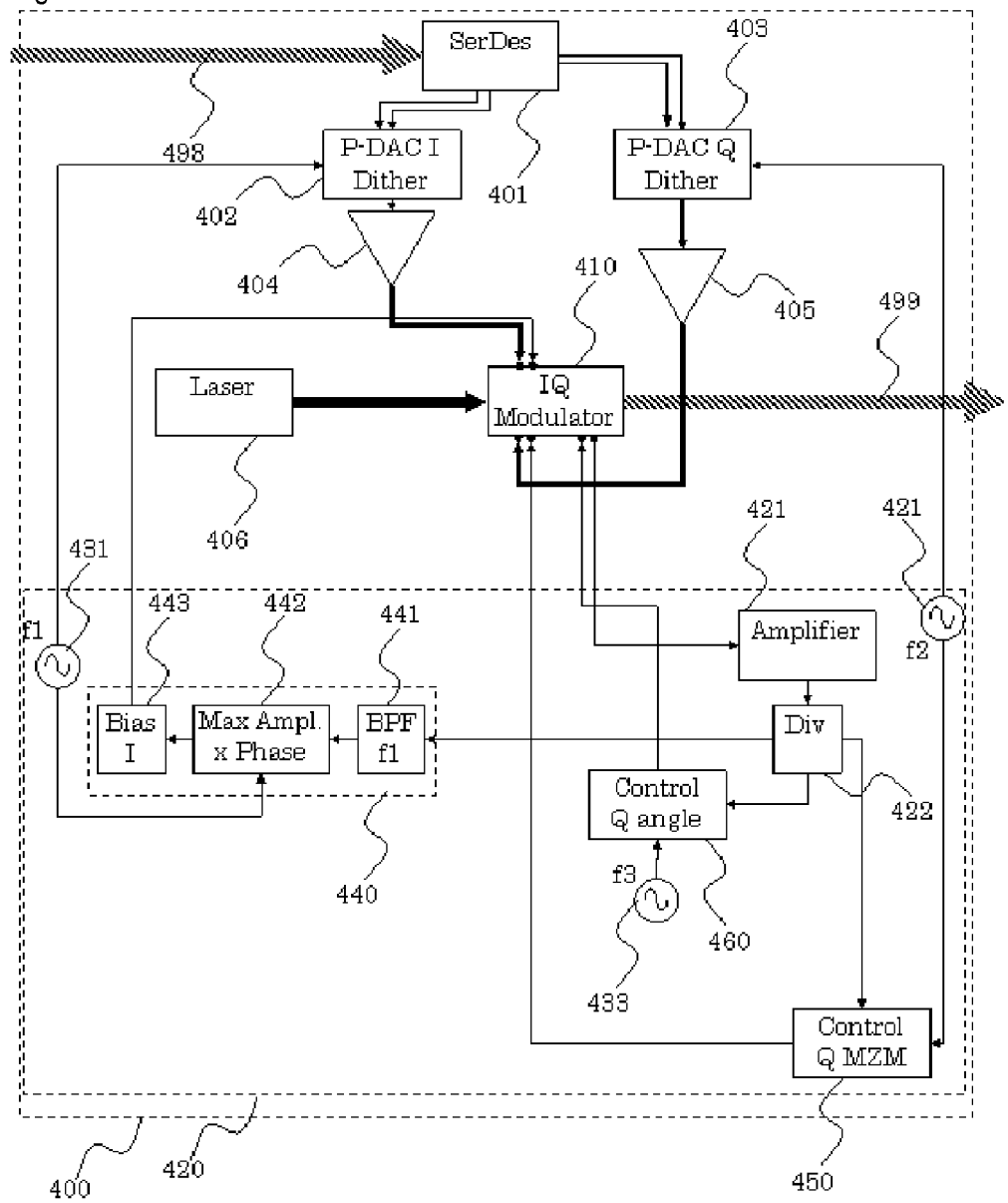

OPTICAL OUTPUT DEVICE AND METHOD FOR CONTROLLING AN OPTICAL TRANSMITTER

This application is a National Stage Entry of PCT/JP2012/001476 filed on Mar. 2, 2011, which claims priority from International Application PCT/JP2011/005356 filed on Sep. 22, 2011, the contents of all of which are incorporated herein by reference, in their entirety.

TECHNICAL FIELD

The present invention relates generally to optical communication technologies and more particularly to optical communication technologies based on multi-level modulation formats, which code more than one binary bit per symbol.

BACKGROUND ART

In order to optimize the investment in optical fiber links, it is desirable to increase the capacity of said links. This can be achieved by increasing the Spectral Efficiency (SE) of the signals transmitted on said links, namely by using more efficient modulation formats for the transmitted information. This can be used in conjunction with Wavelength Division Multiplexing (WDM). Optical communication systems with transmission rates up to 10 Gb/s mainly utilize On Off Keying (OOK) for modulation, where the information is coded on two amplitude levels of the lightwave signal. Besides, higher capacity systems utilize the modulation scheme based on Quadrature Phase Shift Keying (QPSK), which codes the information on four phase levels. Therefore, two binary bits can be coded per transmitted symbol. This is illustrated in the non patent literature 1 (NPL1). In this manner, the necessary bandwidth of the optical spectrum required to transmit information is used more efficiently, enabling the transmission of more information on a fixed bandwidth.

Another way to increase even more the spectral efficiency per transmitted channel, and therefore the link capacity, is to use Quadrature Amplitude Modulation (QAM), where symbols are coded on phase and amplitude levels, and are organized as a combination of multi-level amplitudes in quadrature phase. An example of QAM system is disclosed in the non patent literature 2 (NPL2). In NPL2, the modulation format is 16QAM, where the information is coded into 16 levels, that is, 4 binary bits per symbol. This enables to increase the spectral efficiency as compared to QPSK.

Information in QAM format can be modulated with an optical IQ modulator (In phase—Quadrature phase modulator), sometimes called Cartesian modulator, vector modulator, Dual Parallel modulator or nested modulator depending on the sources. In an IQ modulator, the electric signals drive two independent Mach-Zehnder devices, which can be called children Mach-Zehnder Modulators (MZM), or nested MZM depending on the sources. The children MZM modulate the phase and amplitude of the same optical carrier wave. The phase in one of their outputs is relatively delayed by 90 degrees before being recombined. The phase delay between the outputs of the children MZM can be called an angle of quadrature and is ideally 90 degrees, modulo 180 degrees. Such IQ modulators are used in NPL2 for QAM format and also used in NPL1 for QPSK modulation. Such IQ modulators offer an efficient and proven way to perform QAM format.

More specifically for QAM format, the electrical signals used to drive the IQ modulators are multilevel signals, as opposed to binary signals used for QPSK modulation, such as in NPL1. For instance in NPL2, said multilevel signals are 4 level signals, whose symbols are generated by two binary bits of independent data lanes. In the case of NPL2, two bits, the Most Significant Bit (MSB) and the Least Significant Bit (LSB) are combined by a scheme, which is called by some sources as Power Digital to Analog Converter (DAC). The scheme of power DAC is detailed in non patent literature 3 (NPL3) for two binary bits combined in a 4 level signal. The LSB signal is attenuated, when compared to the MSB with an attenuator and both signals are added with a power divider used as a power combiner. By extension, higher indices QAM format can be obtained with power DAC generating multilevel electrical driving signals with higher level count. For instance, in non patent literature 4 (NPL4), 64QAM is generated with a Power DAC, and 64QAM signal allows higher spectral efficiency. The Power DAC used in NPL4 is described in non patent literature (NPL5) and has the same functions of the Power DAC used in NPL3, with the addition of binary signal regeneration, DC offset and active amplification. In the Power DAC of NPL5, the amplitudes of the three binary signals are adjusted so that after combining said binary signal, a 8-level signal is produced with proper level voltages. Power DAC can be made of discrete RF (Radio Frequency) components, such as NPL3, or can be integrated onto a single chip, as NPL5. The advantage of Power DAC over other schemes used to generate QAM is that they are made with available and proven components and technology, enabling lower costs and better reliability as well as sooner availability, and require less power consumption.

Besides, it is known that there is a drift of DC (Direct Current) bias in IQ modulators due to variation of the temperature or ageing of the device. There are three types of affected biases, that is, the DC biases of each of the two children MZM and DC bias used to set the angle at quadrature. This is already known about QPSK modulation and also known about QAM format if it uses a modulator having the same structure. Drifts in biases result in incorrectly setting the modulator, which causes a degradation of the transmitted signal, and therefore results in degradation of the received signal quality or in worst cases the impossibility to decode the received signal. This problem is likely to be revealed in the characterization tests of the modulator at the production stage or at the assembly stage of the transmitter in which it is used, and when the modulator is used. This problem is solved for OOK, Phase Shift Keying (PSK) modulation and QPSK by using Auto Bias Control (ABC) circuits, which controls the biases of the modulators and to compensate for the DC bias change. In this manner, ABC technology can manage the drift of DC bias drift of IQ modulators, enabling correct modulation and optimal For instance, patent literature 1 (PTL1) discloses a transmitter, which comprises an ABC scheme, which can control biases of an IQ modulator, which emits optical signal modulated with QPSK or even QAM format. The control mechanism of the ABC circuit relies on a low frequency dither or dither signal imprinted onto the DC bias to be controlled or onto the electrical signal driving the IQ modulator. Such methods relying on low frequency dither signals for ABC control are cost and size effective and have proven efficiency for modulation formats up to QPSK.

CITATION LIST

Patent Literature

[PTL 1]
Japanese Patent Application Laid-Open Publication No. 2008-249848

Non Patent Literature

[NPL 1]
L. Nelson et al., "Capabilities of Real-Time Digital Coherent Transceivers", European Conference on Optical Communications (paper Mo1C5, 2010).

[NPL 2]
P. Winzer et al., "Generation and 1,200-km Transmission of 448-Gb/s ETDM 56-Gbaud PDM 16-QAM using a Single I/Q Modulator", (ECOC 2010, PD2.2).

[NPL 3]
P. Winzer et al., "Spectrally Efficient Long-Haul Optical Networking Using 112-Gb/s Polarization-Multiplexed 16-QAM", (Journal of Lightwave Technology, Vol. 28, NO. 4, Feb. 15, 2010, p 547)

[NPL 4]
A. H. Gnauck et al., "Generation and Transmission of 21.4 Gbaud PDM 64QAM Using a High-Power DAC Driving a Single I/Q Modulator", OFC2011, PDPB2

[NPL 5]
A. Konczykowska et al., "42 GBd 3-bit power-DAC for optical communications with advanced modulation formats in InP DHBT", Electronics Letters 17 Mar. 2011 Vol. 47 No. 6

SUMMARY OF INVENTION

Technical Problem

However, in the case of QAM format, data is generated by the IQ modulator when the driving voltages of the children MZM are either near the top of the transmission curve of the MZM, with a near zero slope (near null differential value) or either in areas with high slope (high differential value) located between the top and bottom of the transmission curve of the child MZM. In the case where the driving voltage is in the high slope area, a low frequency dither signal will cause a much higher variation of amplitude and phase of the emitted symbol, than it would cause when the voltage is in the near the top of the transmission curve. Such variation cause degradation in the signal quality, as the emitted signal is deviated from the ideal symbol. Consequently, this will result in degradation of the quality of the received signal. Alternatively, reducing the amplitude of the low frequency dither signal used for ABC control would only result in a reduction of the monitor signal used to control ABC and in consequence in the loss of precision of the ABC control, causing further degradation of the emitted signal. Therefore, as QAM modulation uses MZM driven at areas of their transmission curve with different slopes, low frequency dither signals used for controlling modulator used to modulate QAM format cause additional signal degradations when compared to the case of QPSK modulation format. Therefore there is a need for improvement quality of QAM signal modulated with an IQ modulator controlled by ABC.

The object of the invention is to provide an optical transmitter, a device, and a method of controlling an optical transmitter that improve quality of QAM signal.

Solution to Problem

According to the present invention, there is provided an optical output device comprising:
a combining unit of combining two or more binary electrical signals and adding a dither electrical signal of frequency f, lower than the bit rate of said binary electrical signals, on said two or more binary electrical signals,
an adjusting unit of adjusting the amplitude of said binary electrical signals;
a modulating unit of modulating an optical signal by using said two or more binary electrical signals.

According to the present invention, there is provided an optical module comprising:
an optical input device generating a electric signal from an inputted optical signal, and
an optical output device generating a outputted optical signal,
said optical output device further comprising:
a combining unit of combining two or more binary electrical signals and adding a dither electrical signal of frequency f, lower than the bit rate of said binary electrical signals, on said two or more binary electrical signals,
an adjusting unit of adjusting the amplitude of said binary electrical signals;
a modulating unit of modulating said outputted optical signal by using said two or more binary electrical signals.

According to the present invention, there is provided a device generating a multilevel electrical signal, comprising:
a combining unit of combining two or more binary electrical signals;
an adjusting unit of adjusting the amplitude of said binary electrical signals;
an adding unit of adding a dither electrical signal of frequency f, lower than the bit rate of said binary electrical signals, on said two or more binary electrical signals, wherein
the phase of said dither electrical signal depends on the value of said binary signal to which it is added;
the phase of said dither electrical signal is susceptible to change for each bit of said binary signal.

According to the present invention, there is provided a method for controlling an optical transmitter, comprising:
generating a multilevel electrical signal by means of combining two or more binary electrical signals, where said multilevel electrical signal is used to drive a modulator of said transmitter, and adding a dither signal of frequency f, lower than the bit rate of said binary electrical signals, on two or more of said binary electrical signals,
modulating a optical signal by using said two or more binary electrical signals.

Advantageous Effect of Invention

By this invention, an optical transmitter, a device, and a method of controlling an optical transmitter that improve quality of QAM signal is provided.

BRIEF DESCRIPTION OF DRAWINGS

3C is a curve representing the transmission characteristics of a MZM used in the transmitter of FIG. 1.

FIG. 4 is a schematic representation of an optical transmitter according to the first exemplary embodiment of the invention.

DESCRIPTION OF EMBODIMENTS

Base Technology of Embodiments

Figure 1:
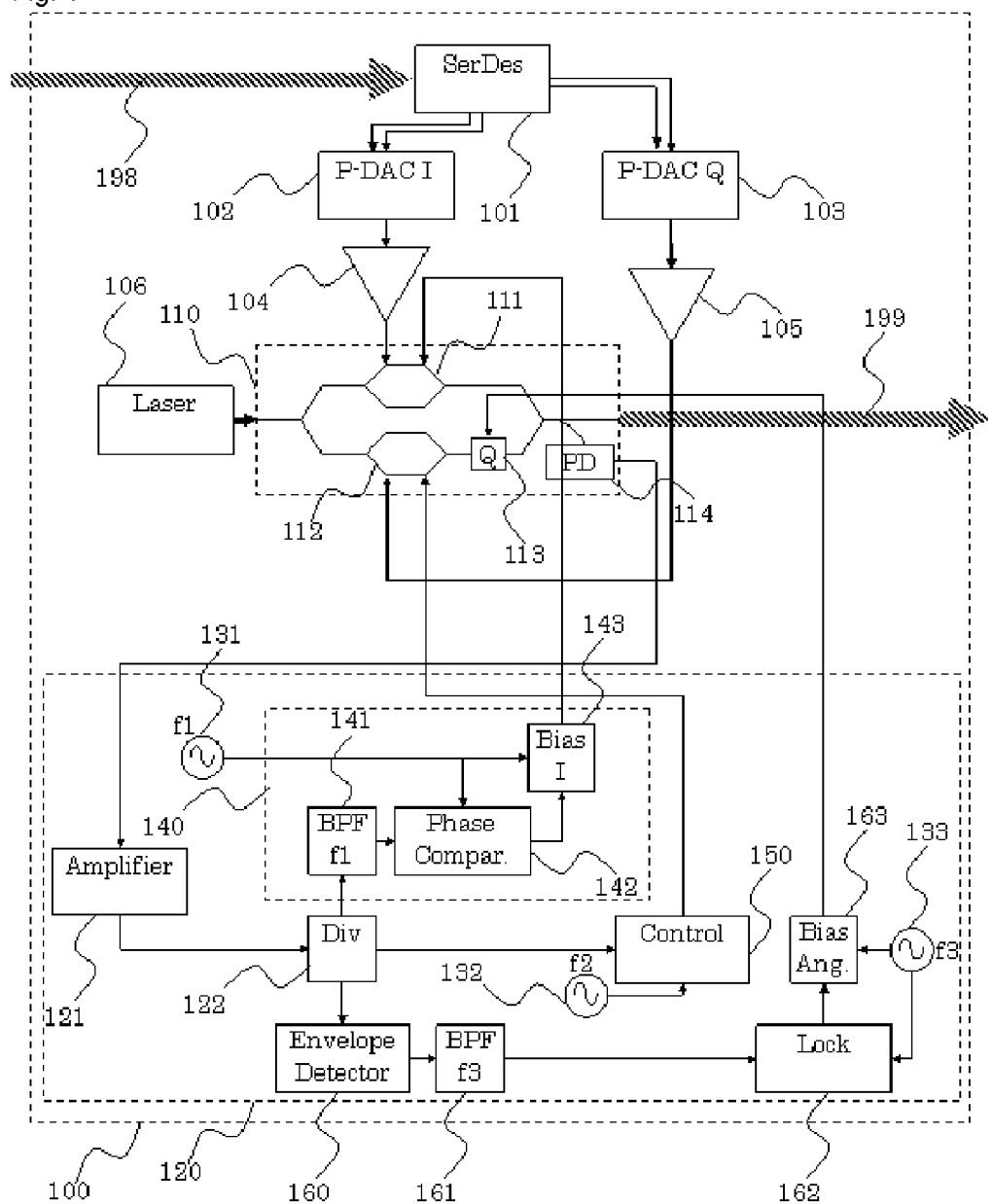
FIG. 1 is a schematic representation of an optical transmitter including an IQ modulator controlled with an ABC circuit.

FIG. 1 is a schematic representation of an optical transmitter 100 including an IQ modulator 110 and an ABC (Auto Bias Control) circuit 120. The optical transmitter 100 represented on FIG. 1 emits a lightwave signal 199 modulated according to the 16QAM format by the IQ modulator 110 according to a logical binary data stream 198. A serializer-deserializer 101 generates two binary signals for the I components and two others for the Q components of the IQ modulator 110. The power DAC (Digital Analog Converter) 102 transforms the two binary signals coming from serializer-deserializer 101 into a 4-level signal, which is amplified by the driver 104, so that its amplitude is optimal for the I child Mach-Zehnder Modulators (MZM) 111 of the IQ modulator 110. Identically, the power DAC 103 generates a 4-level signal from the two binary signals generated by 101. The 4-level signal emitted by the power DAC 103 is amplified by the driver 105 to drive the Q child MZM 112 of the modulator 110. A laser 106 emits Continuous Wave (CW) light, which is modulated by the IQ modulator 110 according to the driving signals generated by the power DAC 102 and 103 and respectively amplified by the drivers 104 and 105.

The IQ modulator 110 includes two child MZM 111 and 112 which are used for I component and Q component, respectively. The IQ modulator 110 also includes a phase shifting element 113 and an integrated monitor Photo-Detector (PD) 114. The phase shifting element 113 enables to control the angle of the quadrature in the IQ modulator 110. The monitor PD 114 generates an electrical signal proportional to the intensity of the modulated light signal and can be used to monitor the conditions of the IQ modulator 110.

The ABC circuit 120 controls DC biases of the children MZM 111 and 112, as well as the bias controlling the angle of the quadrature through the phase shifting element 113, according to the monitor signal provided by the monitor PD 114. The ABC circuit 120 uses the dithers generated by oscillators 131, 132 and 133, which generate sine signals at the respective independent frequencies f1, f2 and f3, to control the biases of the I child MZM 111, the Q child MZM 112 and the phase shifting element 113, respectively. These frequencies can be in a range from a few tens of hertz to a few megahertz. The monitor signal generated by the monitor PD 114 is amplified by an amplifier 121 and is subsequently split by a divider 122 into three equal signals.

A control circuit 140 generates the DC bias for the Ichild MZM 111 according to the output of the divider 122 and the sine voltage at the frequency f1 generated by the oscillator 131. A band pass filter 141 has a central frequency f1 and a bandwidth narrow enough to eliminate other frequency components at f2 and f3. The amplitude of the output of the band pass filter 141 is proportional to the frequency component at f1 of the monitor signal generated by the monitor PD 114. A phase comparator 142 generates an error signal proportional to the amplitude of the output of the band pass filter 141 and to the phase difference between the signal extracted by the band pass filter 141 around f1 and the sine signal at f1 generated by the oscillator 131. A bias circuit 143 generates a DC voltage to control the bias of the I-child MZM 111 in order to minimize the error signal generated by the phase comparator 142 and having a dither component at the frequency f1.

Another control circuit 150 is identical to the control circuit 140 and has a band pass filter with a central frequency f2. The control circuit 150 controls the DC bias of the Q-child MZM 112 according to the output of the divider 122 proportional to the monitor signal generated by the monitor PD 114, in the same manner as the control circuit 140.

The third output of the divider 122 is fed to an envelope detector 160, whose outputs are filtered by a band pass filter 161 with a central frequency f3. The output of the envelope detector 160 generates a signal reflecting RF power spectrum of the monitor signal generated by the monitor PD 114. A locking circuit 162 generates an error signal proportional to the output of the band pass filter 161 using the dither frequency f3. Finally, an angular bias circuit 163 generates a voltage minimizing the error signal generated by the locking circuit 162 and having a dither frequency f3. The voltage generated by the angular bias circuit 163 controls the angle of the quadrature of the IQ modulator 110 through the phase shifting element 113.

Figure 2:
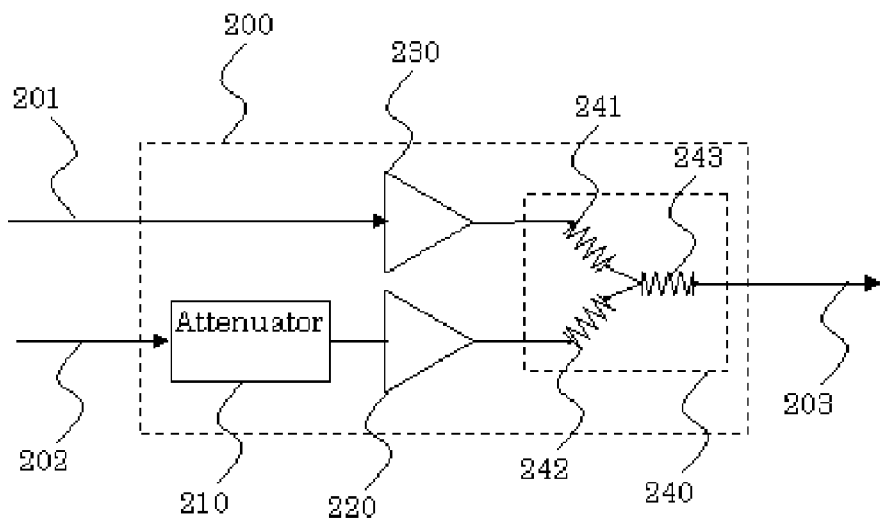
FIG. 2 is a schematic representation of a power DAC used in the transmitter of FIG. 1.

FIG. 2 is a schematic representation of a power DAC noted 200, which can be used for the power DAC 102 and 103 of the transmitter 100 of FIG. 1. The power DAC 200 has two inputs 201 and 202, respectively the MSB and the LSB, which are two binary electrical signals. The output 203 of the power DAC 200 is a multilevel electrical signal. In this case, the power DAC 200 is a 2 bit DAC, therefore output 203 is a 4-level signal. 210 is an attenuator, which reduces the amplitude of the signal 202. Typically the attenuation of attenuator 210 is between 4 dB and 6 dB, but other values are applicable. The amplifiers 220 and 230 amplify the binary signals and also avoid reflections from the power divider 240, which improves the quality of the generated output 203. 220 and 230 are not necessary to the functionality of 200 but they improve the performance of 200. The power divider 240 is composed of three resistors, 241, 242 and 243. The power divider 240 is used in a combiner scheme, where two binary electrical signals are combined into the output signal 203. As the two binary inputs of 240 have different amplitudes, the output 203 has four levels. The four levels of 203 can be set through the choice of the value of the attenuator 210 and through the gain of the amplifiers 220 and 230.

FIG. 3 is a collection of simulation result for the optical transmitter 100 of FIG. 1 for 32 Gbaud 16QAM optical signal. The transmitter uses the power DAC 200 of FIG. 2 for the devices 102 and 103. The attenuator 210 of the power DAC 200(102 and 103) is set to 4.5 dB. FIG. 3A is the eye diagram of the electrical outputs of the serializer-deserializer 101. The binary signal plotted on FIG. 3A is applied to the inputs of the power DAC 200. FIG. 3B is the eye diagram of the output of the power DAC 200(102 and 103). The signal of FIG. 3B has four levels, which consists in the combinations of the two levels of the MSL and LSB inputs of power DAC 200(102 and 103).

Figure 3A:
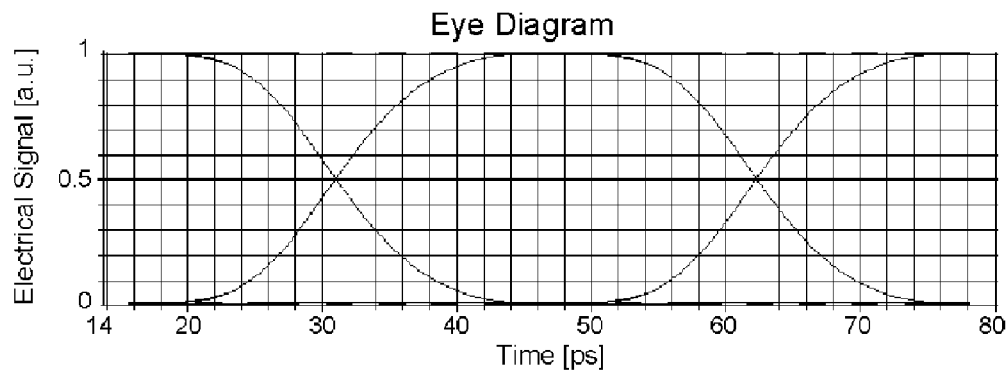
FIG. 3A is an eye diagram of the binary electrical waveform used to generate a multilevel signal according to the power DAC of FIG. 2.
Figure 3B:
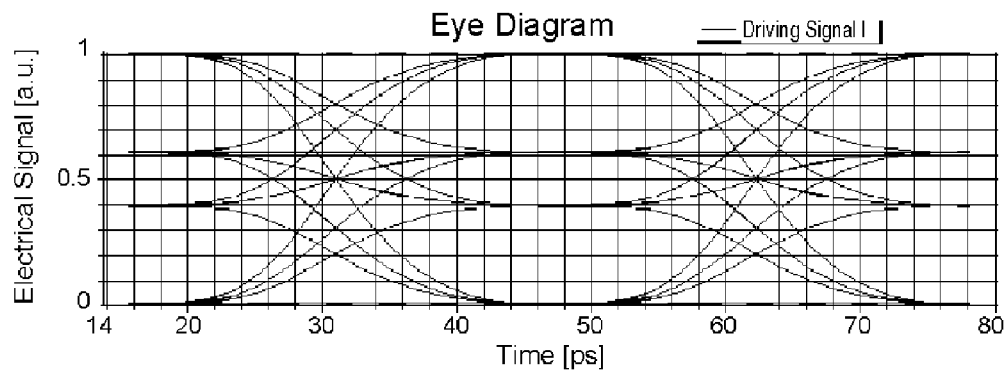
FIG. 3B is an eye diagram of the multilevel signal generated by the power DAC of FIG. 2. FIG.
Figure 3C:
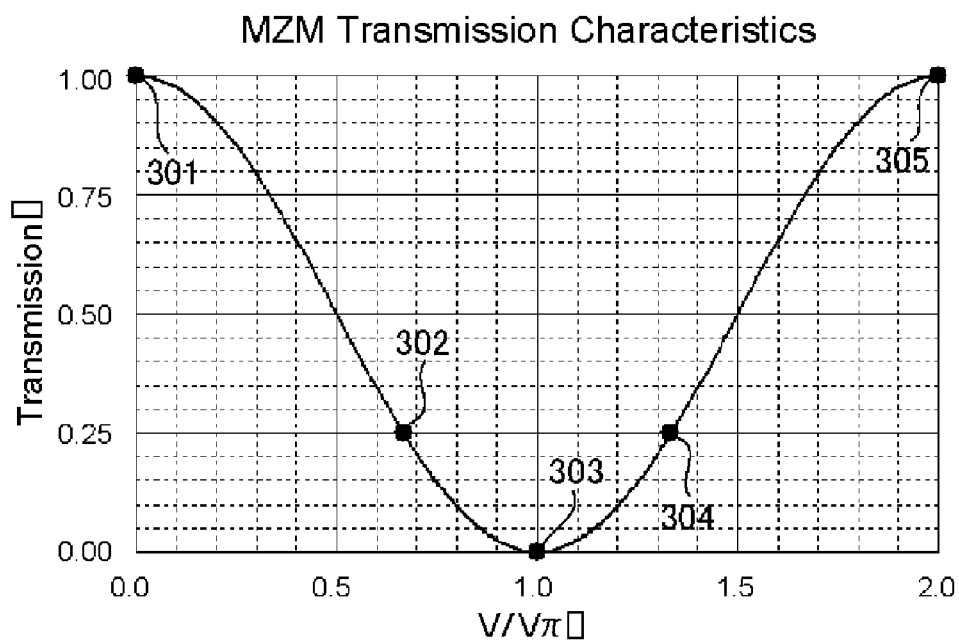
FIG. 3D is a constellation map of the lightwave signal generated by the transmitter of FIG. 1 in different conditions
FIG. 3E is a constellation map of the lightwave signal generated by the transmitter of FIG. 1 in different conditions.
FIG. 3F is a histogram summarizing the quality of the signal mapped on FIG. 3D and FIG. 3E.
FIG. 3G is plot of a four level electrical signal combine with a low frequency dither signal.

FIG. 3C is the transmission curve of a MZM used as child MZM 111 and 112 of the IQ modulator 110. The abscissa represents the input voltage normalized by Vpi, where Vpi is the voltage difference between conditions for constructive interference and destructives interferences of the MZM. The points 301 and 305 represent the constructive interference points (maximum transmission) and have a difference of phase of 180 degrees. The point 303 corresponds to the destructive interference point of the MZM. When used in the IQ modulator 110 of the transmitter 100, the child MZM 111 and 112 are DC biased so that the central voltage is located at Vpi and is driven with electrical signals of amplitude equal to twice Vpi. When the child MZM 111 and 112 of 110 are driven by a multilevel signal plotted on FIG. 3B after proper amplification by drivers 104 and 105, the four levels correspond to the points 301, 302, 304 and 305 on the curve of FIG. 3C.

Figure 3D:
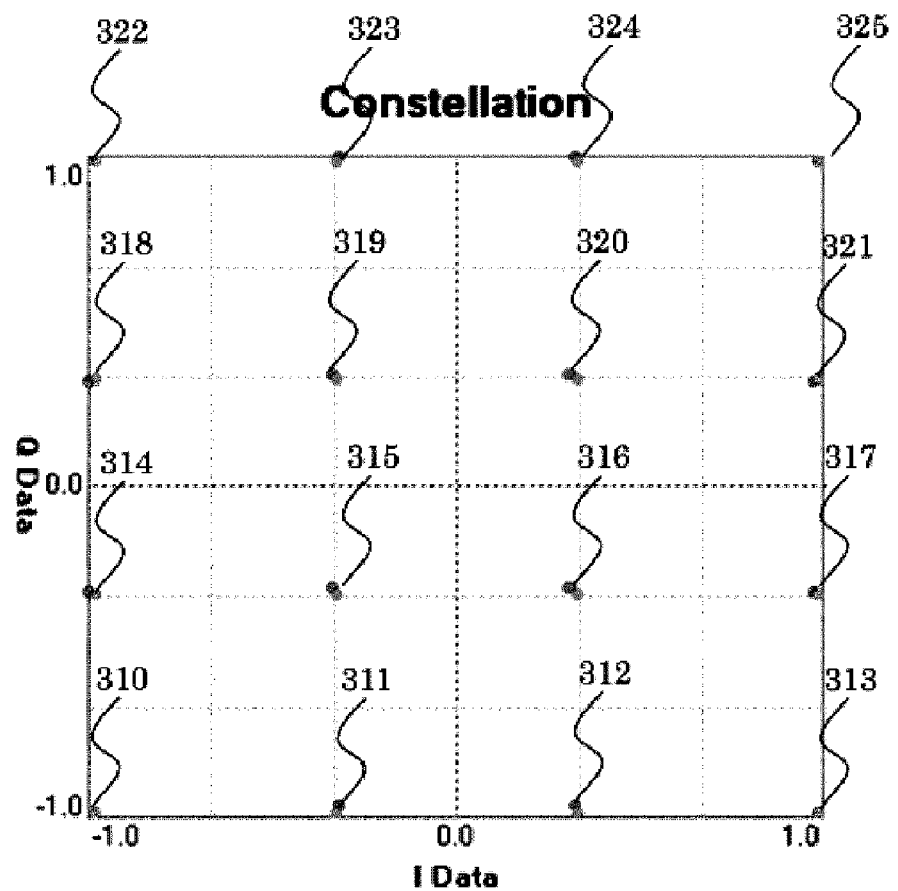

First, on FIG. 3D, the ABC circuit 120 of the optical transmitter 100 is turned off, as well as the low frequency dither signal generators 131, 132 and 133. The DC biases of the IQ modulators are ideally set, i.e. the child MZM 111 and 112 are set at Vpi and the quadrature phase is set at 90 degrees. The constellation map of FIG. 3D is measured immediately after ideal setting, as the characteristics of the modulated signal would deteriorate within few tens of minutes due to drift of the three DC biases of the IQ modulator 110 because of change in temperature of the optical transmitter 100. The plotted points are chosen at the center of the optical symbols. The 16 symbols of 16QAM signal are noted with consecutive numerals from 310 to 325, with attribution chosen for convention only, with no relation to the coding and mapping operated between the binary data stream 198 and the emitted signal 199. For the symbols 310, 314, 318 and 322, the child MZM 111 of the IQ modulator 110 is driven by electrical symbols reaching the point 301 of the transmission curve. For the symbols 311, 315, 319 and 323, the child MZM 111 is driven by electrical symbols reaching the point 302 of the transmission curve. For the symbols 312, 316, 320 and 324, the child MZM 111 is driven by electrical symbols reaching the point 304 of the transmission curve. For the symbols 313, 317, 321 and 325, the child MZM 111 is driven by electrical symbols reaching the point 305 of the transmission curve. On the quadrature phase side, for the symbols 310, 311, 312 and 313, the child MZM 112 of the IQ modulator 110 is driven by electrical symbols reaching the point 301 of the transmission curve. For the symbols 314, 315, 316 and 317, the child MZM 112 is driven by electrical symbols reaching the point 302 of the transmission curve. For the symbols 318, 319, 320 and 321, the child MZM 112 is driven by electrical symbols reaching the point 304 of the transmission curve. For the symbols 322, 323, 324 and 325, the child MZM 112 is driven by electrical symbols reaching the point 305 of the transmission curve. On the constellation map of FIG. 3D, the symbols are very close to the ideal points of the constellation, which is expected from a transmitter with good characteristics. It is expected that the ABC circuit 120 should preserve this signal quality.

Figure 3E:
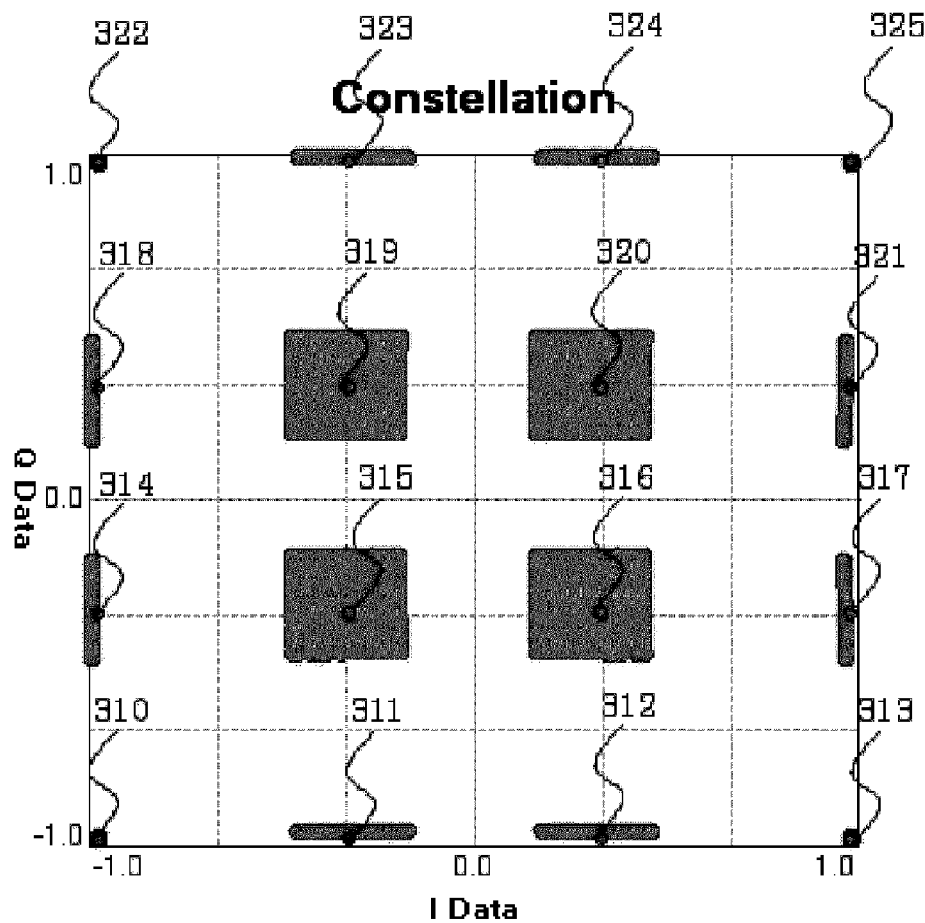

Then, on FIG. 3E, the ABC circuit 120 as well as low frequency dither signal generators 131, 132 and 133 is turned on and the ABC circuit 120 ensures that the DC biases of the ABC circuit 120 are maintained in the optimal conditions, which were set manually on FIG. 3D. For direct comparison reason, the symbols of the constellation map of FIG. 3E are noted with the same numerals as the ones of FIG. 3D. It can be observed that the symbols of FIG. 3E are spread due to the use of low frequency dither signals of the ABC circuit 120. This means a degradation of the emitted signal quality, resulting in a degradation of the received signal and additional errors. Alternatively, the distance between symbols on the constellation of FIG. 3E will be reduced, which means lower tolerance to noise and distortions of the emitted signal. The symbols 311, 312, 315, 316, 319, 320, 323 and 324 are affected by the low frequency dither signal applied on the DC bias of the I child MZM 111. In the same manner, symbols 314, 315, 316, 317, 318, 319, 320 and 321 are affected by the low frequency dither signal applied to the DC bias of the Q child MZM 112. It can be understood that the low frequency dither signal dither will degrade the quality of the symbols emitted when the child MZM 111 and 112 when they electrical signal is in the high slope area of the transmission curve of FIG. 3C. This problem is specific to QAM modulation, as QPSK modulation does not use these points.

Figure 3F:
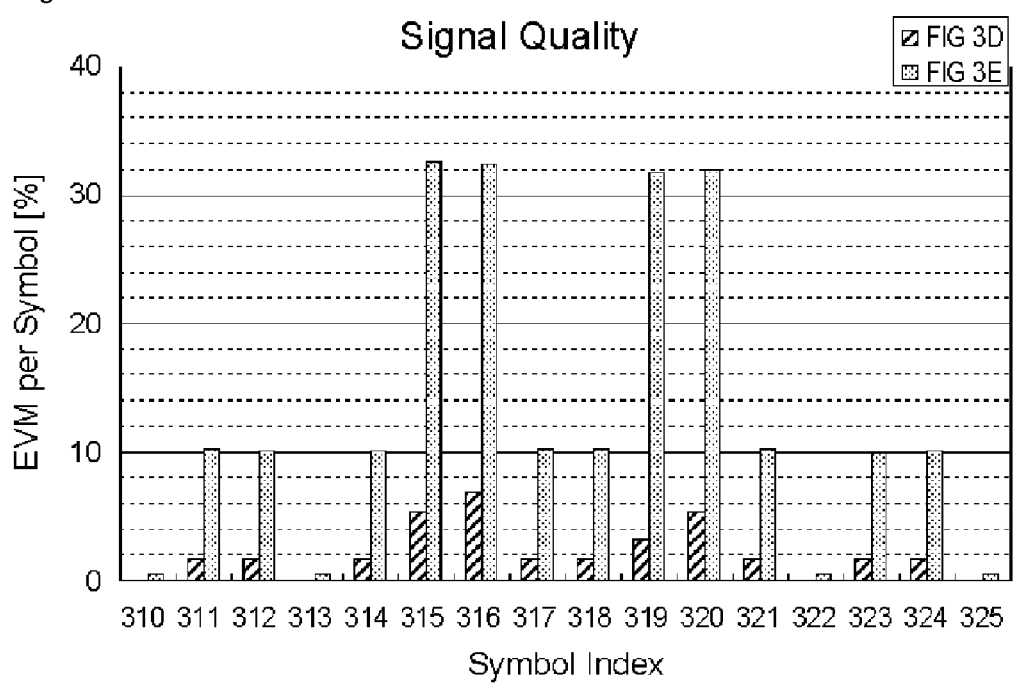

FIG. 3F quantifies and summarizes the signal quality of the constellation maps of FIG. 3D and FIG. 3E by symbol with Error Vector Magnitude. Error Vector magnitude represents the difference between the ideal constellation symbol and the emitted symbol. It is defined as follows.

$$EVM = \sqrt{\frac{\frac{1}{N} \times \sum_{i=0}^{N} \|S_{ideal,i} - S_{measured,i}\|^2}{\frac{1}{N} \times \sum_{i=0}^{N} \|S_{ideal,i}\|^2}} \quad (1)$$

where $S_{ideal}$ is the ideal point on constellation map and $S_{measured}$ is the point emitted by the transmitter. Whereas the ABC circuit 120 is supposed to preserve the emitted signal quality despite DC bias voltage drifts, it causes additional penalty for QAM modulation when the signals are generated with points in the high slope area of the transmission curve of the transmission curve.

Alternatively, the low frequency dither signal f1 and f2 emitted by generators 131 and 132 is combined to the I and Q electrical data driving the IQ modulator 110, instead of being applied to the DC biases of the child MZM 111 and 112. A four level electrical signal combine with a low frequency dither signal is plot on FIG. 3G. The levels 330, 331, 332 and 333 represent the four levels with the dither signal imprinted on them. For identical dither signal frequency and amplitudes, the obtained signal constellation is identical to FIG. 3E.

First Exemplary Embodiment

FIG. 4 is a schematic representation of an optical transmitter 400 including an IQ modulator 410 and an Auto Bias Control (ABC) circuit 420. The optical transmitter 400 represented on FIG. 4 emits a lightwave signal 499 modulated according to the 16QAM format by the IQ modulator 410 according to a logical binary data stream 498. The serializer-deserializer 401 is identical to the serializer-deserializer 101 of FIG. 1. The power DAC 402 transforms the two binary signals coming from 401 into a four-level signal, which is amplified by the driver 404, so that its amplitude is optimal for the IQ modulator 410. Identically, the power DAC 403 generates a 4-level signal from the two binary signals generated by the serializer-deserializer 401. Moreover, the power DAC 402 and 403 imprints low frequency dither signals on their output multilevel electrical signals, according to the low frequency dither signals generated by the generators 431 and 432 of the ABC circuit 420. The driver amplifiers 404 and 405 are identical to the drivers 104 and 105 of FIG. 1. A laser 406 emits Continuous Wave (CW) light, which is modulated by the IQ modulator 410 according to the driving signals generated by the power DAC 402 and 403 and respectively amplified by the drivers 404 and 405. The IQ modulator 410 is identical to the driver 110 of FIG. 1.

The ABC circuit 420 controls DC biases of the child MZM of the IQ modulator 410 as well as the bias controlling the angle of the quadrature of 410, according to the monitor signal provided by the monitor PD integrated in the IQ modulator 410. Alternatively, a PD external to the IQ modulator 410, which receives a portion of light tapped from the lightwave signal 499 can be used to generate the monitor signal for the ABC circuit 420. The ABC circuit 420 uses the dithers generated by oscillators 431, 432 and 433, which generate sine signals at the respective frequencies f1, f2 and f3. The dither signals of frequencies f1 and f2 are used by the power DAC 402 and 403; the dither signal of frequency f3 is used to control the angle of quadrature of the IQ modulator 410. These frequencies can be in a range from a few tens of hertz to a few megahertz. The amplifiers 421 and the divider 422 are identical to 121 and 122 of FIG. 1.

A control circuit 440 generates the DC bias for the I child MZM 111 according to the output of the divider 422, filtered through the band pass filter 441. The band pass filter 441 has a central frequency f1 and a bandwidth narrow enough to eliminate other frequencies different from f1. The amplitude of the output of the band pass filter 441 is proportional to the frequency component at f1 of the monitor signal used by the ABC circuit 420. The circuit 442 generates an error signal proportional to the amplitude of the output of the band pass filter 441 and to the phase difference between the signal extracted by the band pass filter 441 around f1 and the sine signal at f1 generated by the oscillator 431. A bias circuit 443 generates a DC voltage to control the bias of the I child MZM 111 in order to minimize the error signal generated by the circuit 442. The DC bias generated by 443 does not contain any low frequency dither signal.

Another control circuit 450 is identical to the control circuit 440 and has a band pass filter with a central frequency f2. The control circuit 450 controls the DC bias of the Q child MZM of 410 according to the output of the divider 422 proportional to the monitor signal used by the ABC circuit 420, in the same manner as the control circuit 440.

The low frequency generator 433 is identical to the oscillator 133 of FIG. 1. The control circuit 460 contains an envelope detector similar to the envelope detector 160, a band pass filter centered on f3 similar to the band pass filter 161, a locking circuit similar to the locking circuit 162, and a DC bias generator identical to the angular bias circuit 163 of FIG. 1. The voltage generated by the control circuit 460 controls the angle of the quadrature of the IQ modulator 110.

Figure 5:
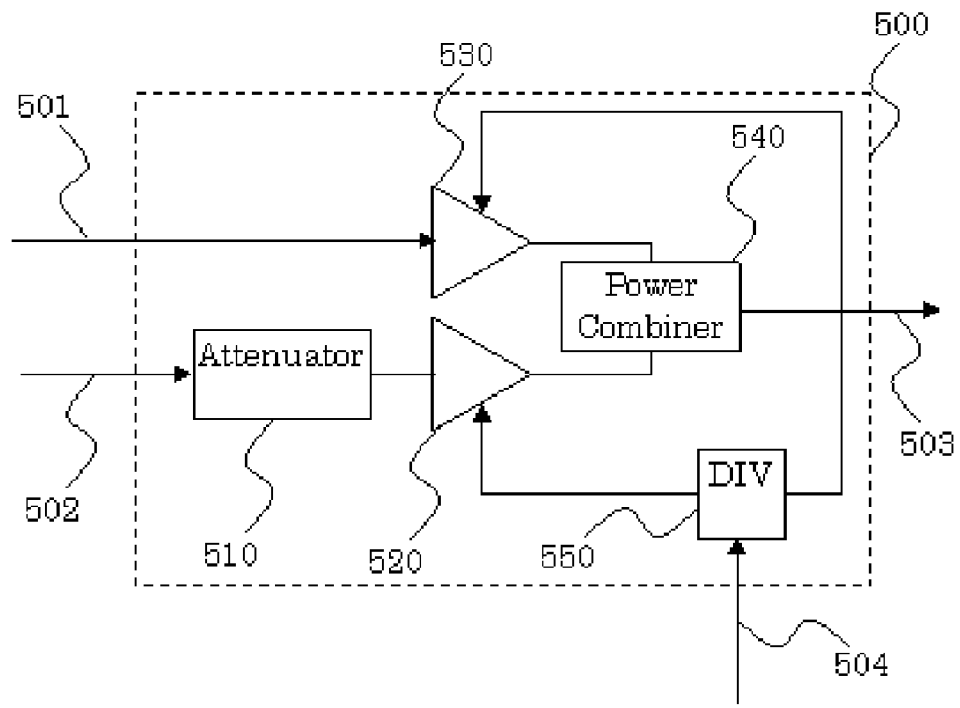
FIG. 5 is a schematic representation of a power DAC according to the first exemplary embodiment of the invention.

FIG. 5 is a schematic representation of a power DAC noted 500 used in the first embodiment of the present invention. The power DAC 500 can be used for the devices 402 and 403 of the transmitter 400 of FIG. 4. The power DAC 500 has two inputs 501 and 502, respectively the MSB and the LSB, which are two binary electrical signals. The output 503 of the power DAC 500 is a multilevel electrical signal. In this case, the power DAC 500 is a 2 bit DAC, therefore the outpot 503 is a 4-level signal. 510 is an attenuator, identical to the attenuator 210 of the power DAC 200 of FIG. 2. The amplifiers 520 and 530 amplify the binary signals and also avoid reflections from the power divider 540, which improves the quality of the generated output 503. A low frequency sine wave 504 is provided to the amplifiers 520 and 530 through the divider 550. The amplifiers 520 and 530 imprint a the low frequency dither signal coming from the divider 504 on their output RF signal. In addition, the phase of the imprinted dither signal depends on the level of the binary input of the amplifiers 520 and 530. Alternatively, the polarity of the imprinted dither signal depends on the level of the binary input of the amplifiers 520 and 530. The power combiner 540 is used to combine the two binary electrical signals output by the amplifiers 520 and 530 into the output signal 503. The power combiner 540 can be made of a power divider similar to the power divider 240. As the two binary inputs of the power divider 540 have different amplitudes, the output 503 has four levels. The 4 levels of the output 503 can be set through the choice of the value of the attenuator 510 and through the gain of the amplifiers 520 and 530. Moreover, as the outputs of the amplifiers 520 and 530 have a low frequency dither signal which depends on the level of the amplified binary signals, the output 503 also has a low frequency dither signal and this dither signal depends on the level of the output 503.

The power DAC 500 can be made of discrete RF components. Alternatively, the power DAC 500 can be made with an Integrated Circuit (IC) chip. Alternatively, the input binary signal 502 can be amplified directly by the amplifier 520 and sequentially attenuated by the attenuator 510, which corresponds to inversing the order of the attenuator 510 and of the amplifier 520; In this case, the power DAC 500 with in inversed order of the attenuator 510 and the amplifier 520 is still applicable for the embodiment of the present invention.

In the optical transmitter 400 of FIG. 4, two power DAC similar to the power DAC 500 are used for the power DAC 402 and 403. The inputs of the power DAC 402 and 403 are two binary signals generated by 401. The power DAC 402 and 403 use respectively low frequency dither signals generated by the generators 431 and 432. The dither signals are imprinted on the multilevel voltage driving the I and Q child MZM of the IQ modulator 410. Therefore, frequency components at f1 and f2 are monitored by the internal PD of 410 and can be extracted by the ABC circuit 420, in order to control the DC biases of the IQ modulator 410.

Figure 6:
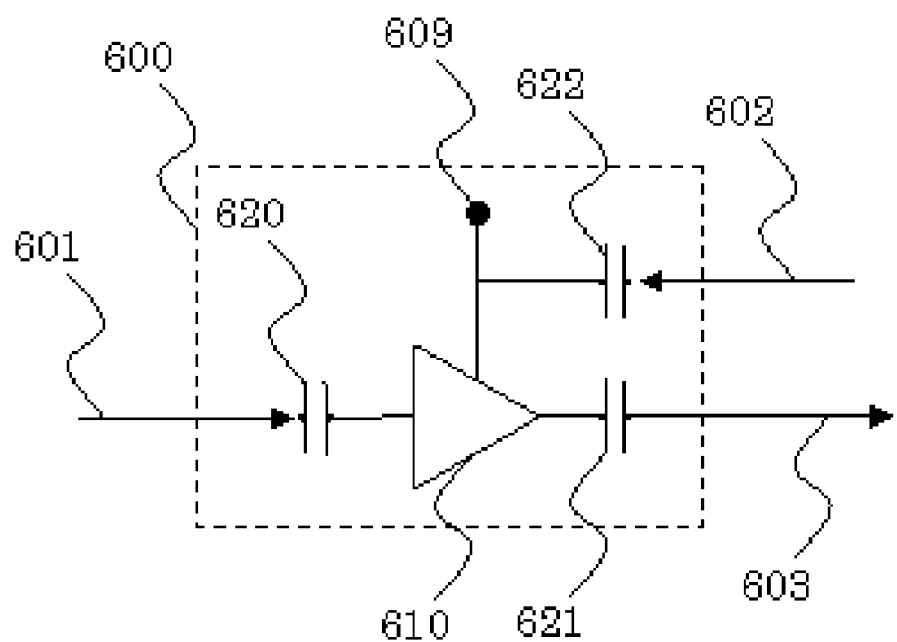
FIG. 6 is a schematic representation of a circuit used by the power DAC of FIG. 5.

FIG. 6 is the schematic representation of an amplifier circuit 600, which can be used for the amplifiers 520 and 530 used in the power DAC 500 of FIG. 5. The input signal 601 is a binary electrical signal with high frequency. The input 602 is a low frequency sine signal. The input signal 601 passes through the condenser 620 and through the amplifier 610. The amplifier 610 is biased with a Vd tension 609. The input 602 passes through the condenser 622 and is added to the bias of the amplifier 610. The output of the amplifier 610 passes through the condenser 621 and is output as the high speed signal 603 from the circuit 600. The high speed signal 603 is the amplified signal from the high speed input 601. However, due to the circuit 600, the high speed signal 603 has a low frequency dither signal with same low frequency as the input 602. Moreover, when the input 601 is high, the added dither signal value is the opposite (opposite amplitude is equivalent to opposite phase here) as when the input 601 is low. Therefore, the high speed signal 603 is a binary electrical signal with a low frequency dither signal, whose phase depends on the level of the input high speed signal 601.

Figure 7:
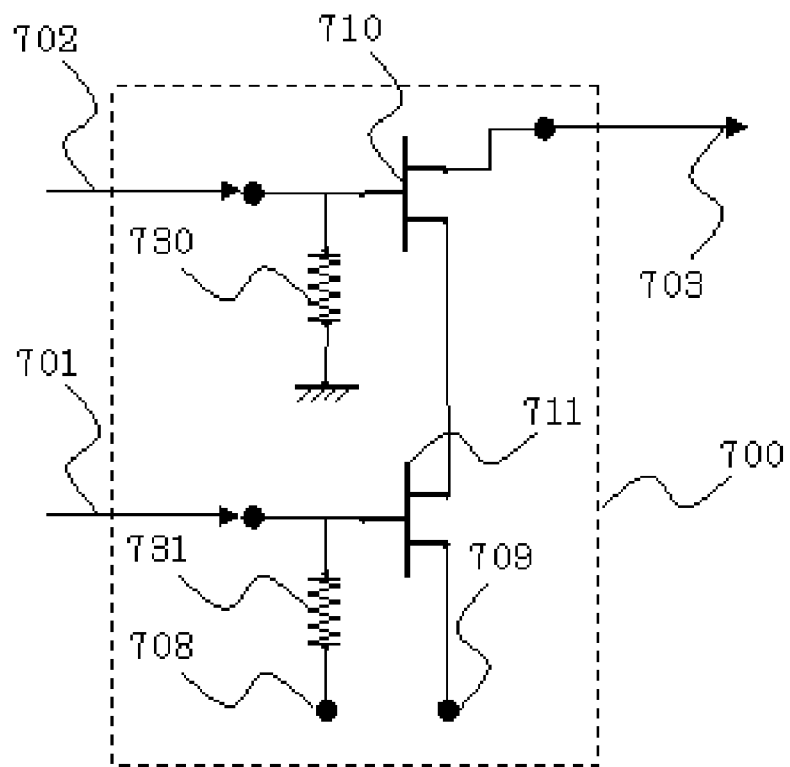
FIG. 7 is another schematic representation of a circuit used by the power DAC of FIG. 5.

FIG. 7 is the schematic representation of another amplifier circuit 700, which can be used for the amplifiers 520 and 530 used in the power DAC 500 of FIG. 5. The input signal 701 is a binary electrical signal with high frequency. The input 702 is a low frequency sine signal. The input 702 passes through the Field Effect transistor (FET) 710 biased with the resistor 730. The output signal 703 is emitted by the FET 710. The input signal 701 passes through the FET 711 biased with the tensions 708 and 709 and the resistor 731. The output signal 703 is the amplified signal from the high speed input 701. However, due to the circuit 700, the output signal 703 has a low frequency dither signal with same low frequency as 702. Moreover, when the high speed signal 701 is high, the added dither signal value is the opposite (opposite amplitude is equivalent to opposite phase here) as when the high speed signal 701 is low. Therefore, the output signal 703 is a binary electrical signal with a low frequency dither signal, whose phase depends on the level of the input high speed signal 701.

Figure 8:
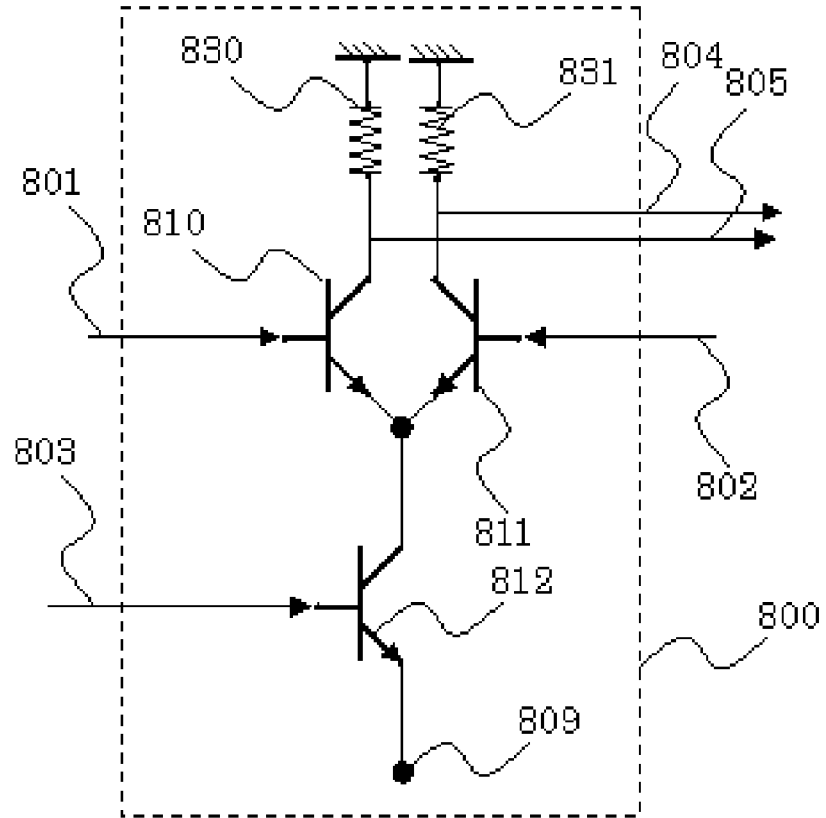
FIG. 8 is a schematic representation of a circuit used by the power DAC of FIG. 5.

FIG. 8 is the schematic representation of another amplifier circuit 800, which can be used for the amplifiers 520 and 530 used in the power DAC 500 of FIG. 5. The circuit 800 is differential, therefore it enables differential design for the power DAC 500 and the optical transmitter 400 of FIG. 4. The input signals 801 and 802 are respectively positive and negative binary electrical signals with high frequency. The input 803 is a low frequency sine signal. The input 803 passes through the transistor 812 biased with the voltage 809. The positive and negative output signals 804 and 805 are emitted by the transistors 810 and 811. The input signals 801 and 802 pass through the transistors 810 and 811 biased with resistors 830 and 831. The output signals 804 and 805 are the amplified signals from the high speed inputs 801 and 802. However, due to the circuit 800, the output signals 804 and 805 have a low frequency dither signals with same low frequency as the input 803. Moreover, when the input signals 801 or 802 are high, the added dither signal value is the opposite (opposite amplitude is equivalent to opposite phase here) as when the input signals 801 or 802 are low respectively. Therefore, the output signals 804 and 805 are binary electrical signals with low frequency dither signals, whose phase depends on the level of the input high speed signals 801 and 802.

Figure 17:
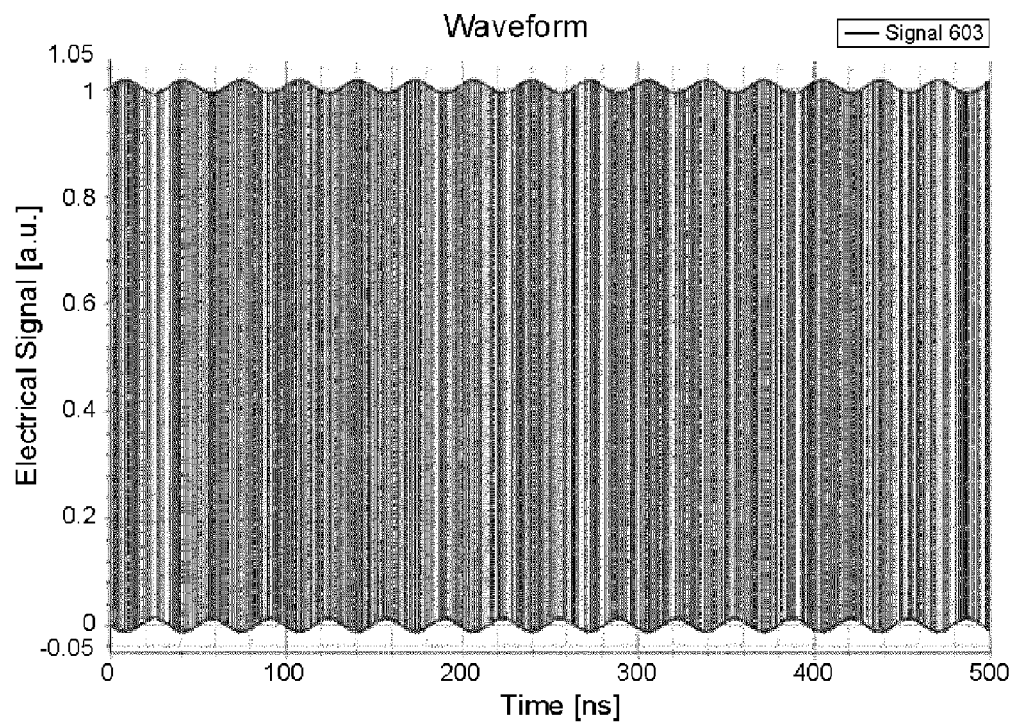
FIG. 17 is a waveform chart of the output signal of the circuit of FIG. 6.

FIG. 17 is a waveform chart of the output signal 603 of the circuit 600 of FIG. 6 used in the power DAC 500 of FIG. 5. The two levels of the signal 603 are noted 1701 and 1702 on FIG. 17. The level 1701 is a high level and it corresponds to bits where the level of the input signal 601 is also high. The level 1702 is a low level and corresponds to bits where the level of the input signal 601 is also high. Both levels 1701 and 1702 are binary levels but they also feature a low frequency dither, which frequency is equal to the frequency of the input low frequency clock signal 602 of FIG. 6. However, according to the circuit of FIG. 6, the phase of the low frequency component imprinted on the level 1701 is opposite (difference of 180 degree) to the phase of the low frequency component of the level 1702, as binary bits near peaks of the low frequency component of the level 1701 are concomitant with binary bits near bottoms of the low frequency component of the level 1702. Another and equivalent way to describe this is to notice that the amplitude sign of the low frequency component imprinted on the level 1701 is of opposite sign of the low frequency component imprinted on the level 1702.

FIG. 9 is a collection of simulation result for the optical transmitter 400 of FIG. 4 for 32 Gbaud 16QAM optical signal. The transmitter uses the power DAC 500 of FIG. 5 for the power DAC 402 and 403. The attenuator 510 of the power DAC 500 is set to 4.5 dB. The amplifiers 520 and 530 of the power DAC 500 are based on the amplifiers 700 of FIG. 7.

Figure 9A:
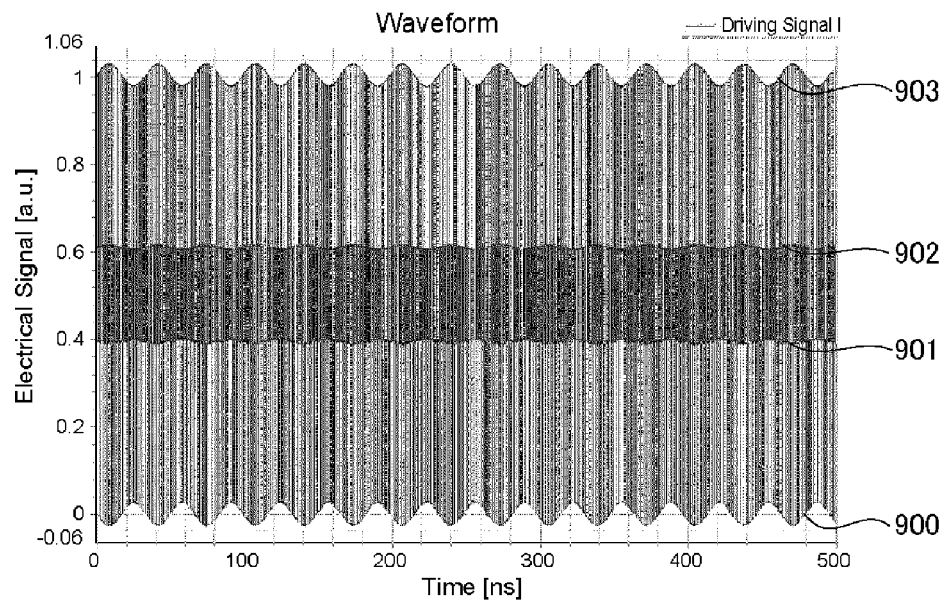
FIG. 9A is a waveform chart of the multilevel signal generated by the power DAC of FIG. 5.

FIG. 9A is waveform chart of the output of the power DAC 402 in the transmitter 400 of FIG. 4. The four output level of the DAC 500 are noted as 900, 901, 902 and 903. On the levels 900 and 903, the levels of the MSB and LSB of 500 are equals, respectively 0 and 1 and the low frequency dither signal is imposed on the output signal. Noticeably, as the phase of the dither signal imposed on each binary signal is dependant on the level of the binary signal, the phase of the dither signal level present on the levels 900 and 903 have phase differences of 180 degrees. On the levels 901 and 902, the MSB and LSB are opposed (respectively 0/1 and 1/0), therefore the resulting dither signal present on the output of 500 is the sum of two dither signals of same frequency but opposite phases. Therefore, the resulting dither signal will have a lower amplitude. In the case of FIG. 9A, the amplitude of the low frequency dither signal on levels 901 and 902 is lower than for the levels 900 and 903. As the degradation of the signal emitted from the transmitter results from the levels corresponding to the high slope region of the child MZM used in the transmitter, the penalty will be reduced with the transmitter implementing the present invention.

Figure 9B:
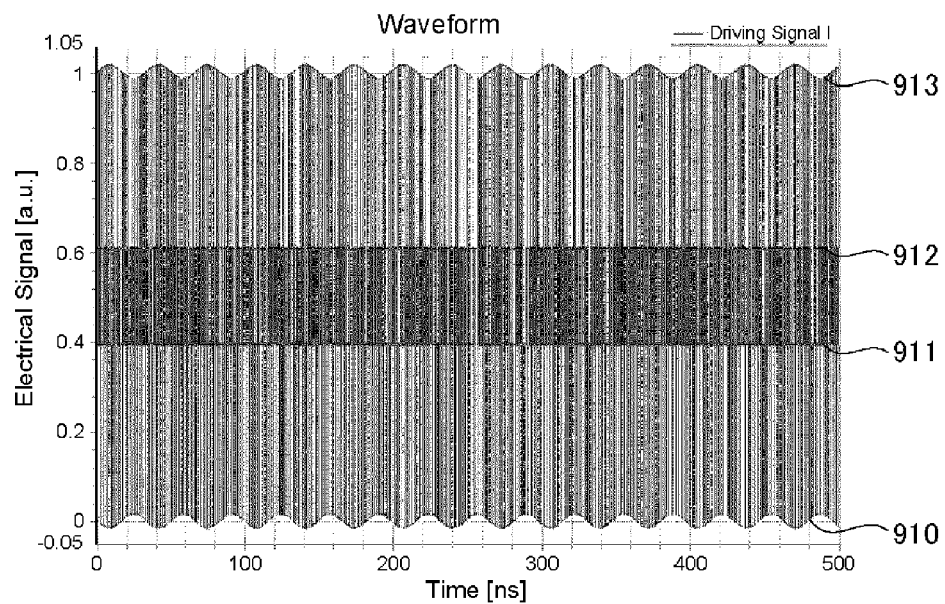
FIG. 9B is a waveform chart of the multilevel signal generated by the power DAC of FIG. 5.

FIG. 9B is waveform chart of the output of the power DAC 402 in the transmitter 400 of FIG. 4 for a different signal adjustment configuration. The four output level of the DAC 500 are noted as 910, 911, 912 and 913. On the levels 910 and 913, the levels of the MSB and LSB of 500 are equals, respectively 0 and 1 and the low frequency dither signal is imposed on the output signal. Again, as the phase of the dither signal imposed on each binary signal is dependant on the level of the binary signal, the phase of the dither signal level present on 910 and 913 have phase differences of 180 degrees. On the levels 911 and 912, the MSB and LSB are opposed (respectively 0/1 and 1/0), therefore the resulting dither signal present on the output of the power DAC 500 is the sum of two dither signals of same frequency but opposite phases. In this configuration, the gain of the amplifiers 520 and 530 as well as the amplitude of the low frequency dither signals at the output of the divider 550 has been adjusted so that the resulting dither signals at the output of the amplifiers 920 and 930 balance each other. Therefore, the resulting dither signals have an amplitude equal to zero, so they are no longer present on levels 912 and 913. Again, the penalty will be reduced with the transmitter implementing the present invention in the dither signal balancing configuration.

Figure 9C:
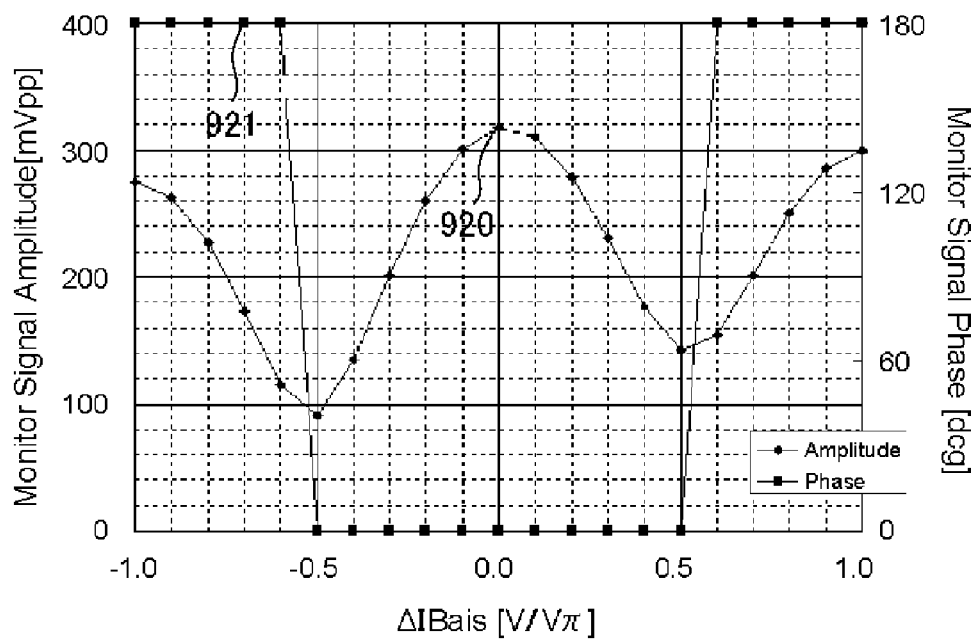
FIG. 9C is a waveform chart of the monitor signal used in the transmitter of FIG. 4.

FIG. 9C is the characteristics curve of the output of the band pass filter 441 of FIG. 4. The abscissa represents the difference between the DC bias applied to the child I MZM of the modulator 410 and the optimal DC bias, represented as point 303 on FIG. 3C. The curves of FIG. 9C are normalized on the abscissa by the value Vpi of the modulator and are limited to the range of −1 to +1 in virtue of the periodicity of the characteristics of the MZM. The curve 920 represents the amplitude of the output of the band pass filter 441 and the curve 921 represents the phase of the output of the band pass filter 441 the band pass filter when compared to the signal generated by the low frequency dither signal generator 431. The low frequency dither signal has been applied on the driving signal according to the power DAC 500, with waveform plot on FIG. 9A. The amplitude characteristics has three maxima, one at the optimal value of 0, and two others at +1 and −1. However, only the optimal value is in phase with the signals generated by the low frequency dither signal generator 431, the other ones are in opposite phase. Therefore, as the circuit 442 multiplies the amplitude by a component proportional to the cosine of the signal phase, the overall maximum will be the optimal point (Delta I=0). The two other maxima of the amplitude are minima of the output of the circuit 442 as the phase is opposite. The circuit 443 generates a DC component for the I child MZM of the modulator 410 in order to maximize the output of the circuit 442. Therefore, in the present configuration, the ABC 420 controls the DC bias of the I MZM of the modulator 410 so that it is in the optimal conditions. The control circuit 450 controls the DC bias of the Q child MZM of the modulator 410 in the same manner, with a frequency f2 different from f1. The control circuit 460 controls quadrature angle according to known methods, such as described in PTL1. The modulator 410 is therefore controlled by the ABC 420 in the optimal conditions. As the power DAC 500 reduces the amplitude of the low frequency dither signal for cases where MSB and LSB are different, the penalty induced on signal 499 by the low frequency dither signal will be reduced by the present invention.

In another aspect of the present invention, the output of the power DAC 402 is plotted on FIG. 9B. Again, the modulator 410 is controlled by the ABC 420 in the optimal conditions. As the power DAC 500 reduces the amplitude of the low frequency dither signal for cases where MSB and LSB are different to null, the penalty induced on signal 499 by the low frequency dither signal will be reduced by the present invention.

Figure 9D:
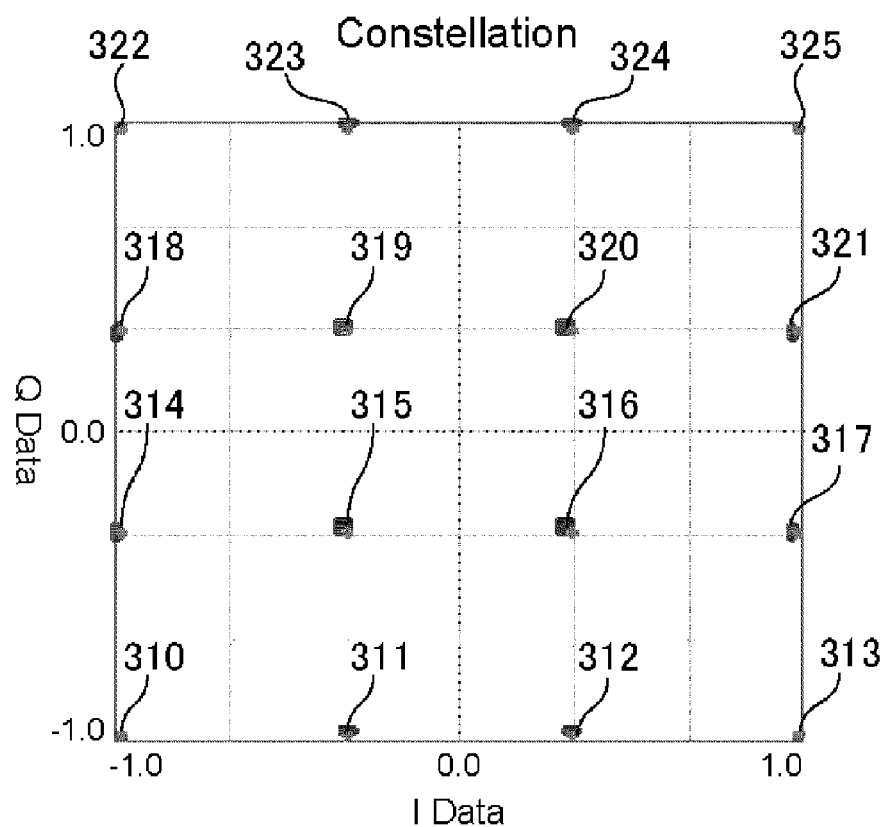
FIG. 9D is a constellation map of the lightwave signal generated by the transmitter of FIG. 4 for the respective signals of FIG. 9A.

First, on FIG. 9D, the ABC circuit 420 of 400 is turned on and the output of the power DAC 402 and 403 is identical to FIG. 9A. For direct comparison reason, the symbols of the constellation map of FIG. 9D are noted with the same numerals as the ones of FIG. 3D, without any respect to the symbol mapping performed by transmitter 400. On the constellation map of FIG. 9D the symbols are very close to the ideal points of the constellation. According to the present invention, the ABC circuit 420 preserves this signal quality of transmitter 400.

Figure 9E:
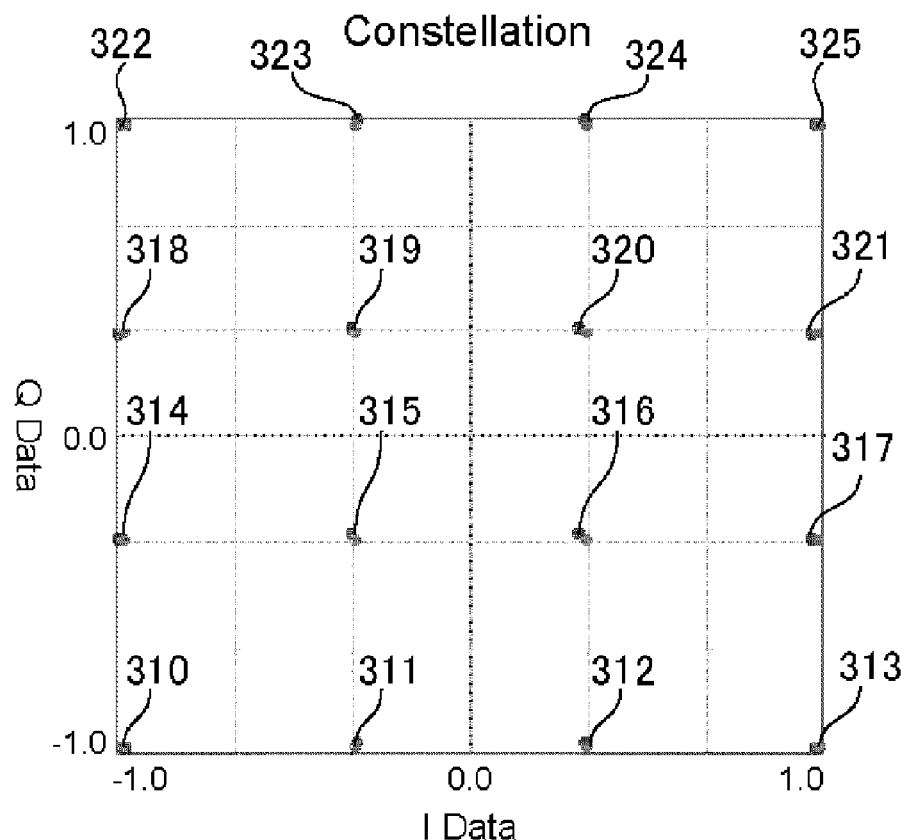
FIG. 9E is a constellation map of the lightwave signal generated by the transmitter of FIG. 4 for the respective signals of FIG. 9B.

Then, on FIG. 9E, the ABC circuit 420 of 400 is turned on and the output of the power DAC 402 and 403 is identical to FIG. 9B. For direct comparison reason, the symbols of the constellation map of FIG. 9E are noted with the same numerals as the ones of FIG. 3D and therefore FIG. 3D, without any respect to the symbol mapping performed by transmitter 400. On the constellation map of FIG. 9E, the symbols are very close to the ideal points of the constellation. According to the present invention, the ABC circuit 420 preserves this signal quality of transmitter 400.

Figure 9F:
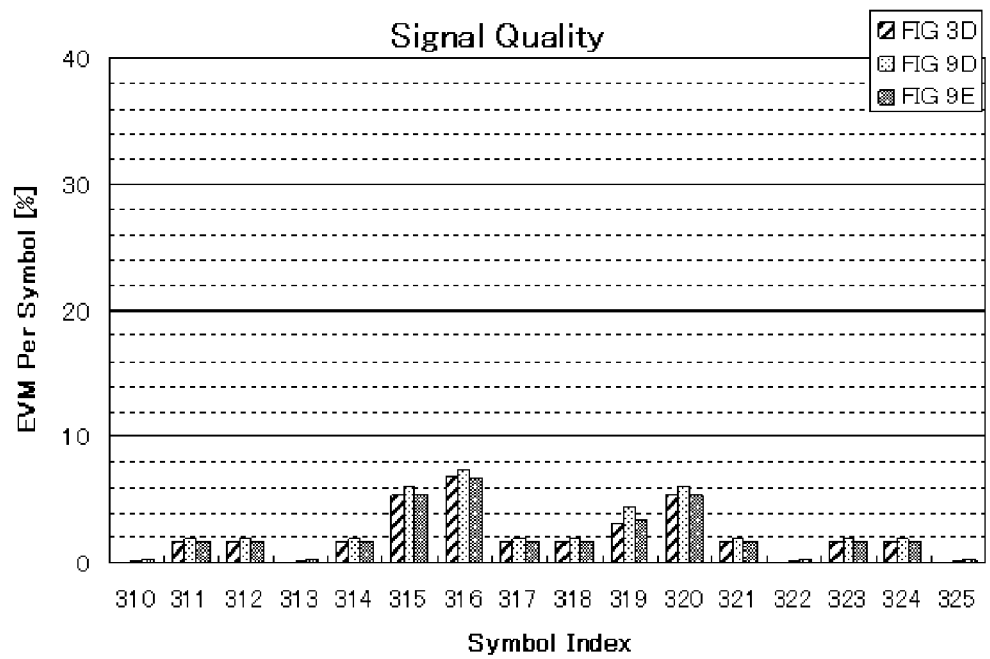
FIG. 9F is a histogram summarizing the quality of the signal mapped on FIG. 9D and FIG. 9E.

FIG. 9F quantifies with EVM and summarizes the signal quality of the constellation maps of FIGS. 9D and 9E, and compares it with the ideal constellation of FIG. 3D. According to the present invention, the signal quality of the emitted signal 499 is preserved, and almost no difference is can be noticed as for FIG. 9E with the optimal conditions. The present invention enabled to restore signal quality that was degraded by traditional method of FIG. 3E.

The present invention enables to control an IQ modulator, emitting a lightwave signal modulated according to QAM format, with a low frequency dither signal and to avoid the degradation of signal quality caused by said dither signal. Moreover, the implementation of the present invention is possible with simple off the shelf electronics, therefore it is cost effective. The present invention can be implemented with little footprint, therefore it is small sized.

Second Exemplary Embodiment

Figure 10:
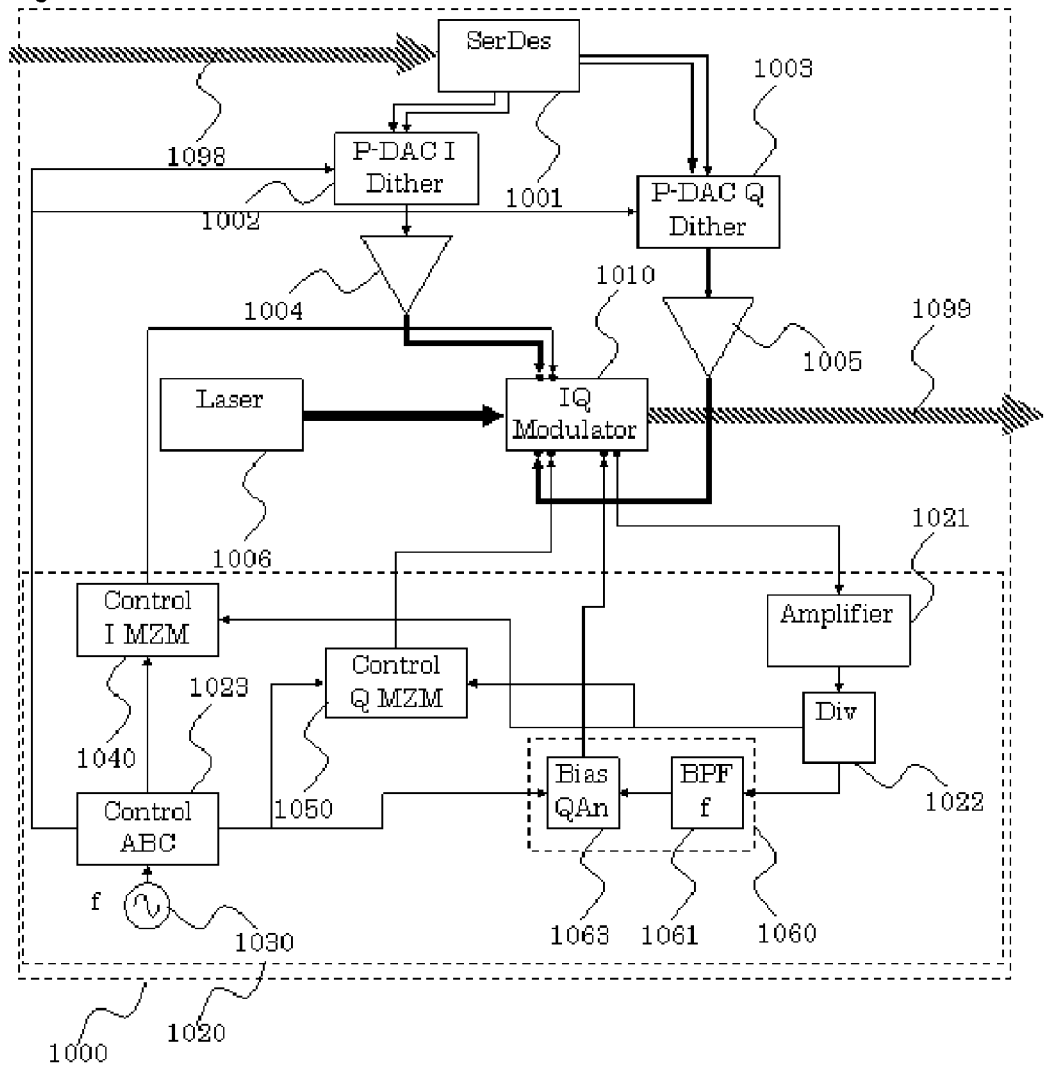
FIG. 10 is a schematic representation of a transmitter according to another exemplary embodiment of the present invention.

FIG. 10 is a schematic representation of an optical transmitter 1000, including an IQ modulator 1010 and an Auto Bias Control (ABC) circuit 1020. The optical transmitter 1000 represented on FIG. 10 emits a lightwave signal 1099 modulated according to the 16QAM format by the IQ modulator 1010 according to a logical binary data stream 1098. The serializer-deserializer 1001 is identical to the serializer-deserializer 101 of FIG. 1. The power DAC 1002 and 1003 are similar to the power DAC 402 and 403 of FIG. 4. The amplifiers 1004 and 1005 are identical to the amplifiers 404 and 405 of FIG. 4. The laser 1006 and the modulator 1010 are identical respectively to the laser 406 and the modulator 410 of FIG. 4.

The ABC circuit 1020 controls DC biases of the child MZM as well as the bias controlling the angle of the quadrature of the modulator 1010, according to the monitor signal provided by the monitor PD integrated in the modulator 1010. The amplifier 1021 and the divider 1022 are respectively identical to the amplifier 421 and the divider 422 of FIG. 4. A low frequency oscillator 1030 generates a low frequency, f, sine wave, which is distributed by the ABC controller unit 1023. Alternatively, the low frequency oscillator 1030 can be integrated within the ABC controller unit 1023. The ABC controller unit 1023 can be realized with a microcontroller or a Digital Signal Processing (DSP) unit. The low frequency sine wave is distributes by the ABC control unit 1023 to the power DAC 1002 and 1003 in order to be imprinted on the driving data for the modulator 1010 according to the schematics of FIG. 5. The low frequency sine wave is also distributed to the control unit 1040 for control of the DC bias for the I child MZM and to the control unit 1050 for the control of DC bias of the Q child MZM. The control units 1040 and 1050 are similar to the control circuits 440 and 450 of FIG. 4 and have band pass filters centered around the frequency f. The control unit 1060 controls the DC bias changing the quadrature angle of the IQ modulator 1010. The control unit 1060 has a band pass filter 1061 centered around the frequency f.

Figure 11:
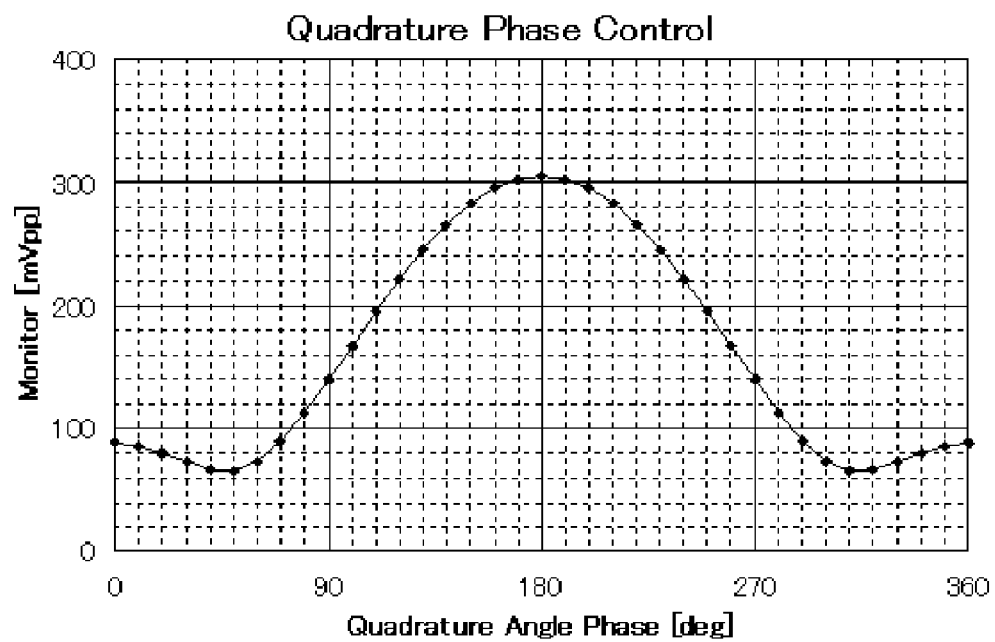
FIG. 11 is a waveform chart of the monitor signal used in the transmitter of FIG. 10.

FIG. 11 is a curve representing the characteristics of the signal at the output of the band pass filter 1061 of FIG. 10 against the angle of quadrature of the modulator 1010. The curve of FIG. 11 has been simulated from the transmitter 1000 with a baud rate of 32 Gbaud and an emitted signal as 16QAM. In a first implementation of the present invention, the DC bias generator 1063 generates a voltage in order to maintain the output of the band pass filter 1061 equal to 140 mVpp, which corresponds to a quadrature angle of 90 degrees modulo 180 degrees. Alternatively, the DC bias generator 1063 generates a voltage in order to maintain the output of 1061 equal to 140 mVpp with the condition of a positive slope around the control value, which corresponds to a quadrature angle of 90 degrees modulo 360 degrees. In either implementations, the angle of quadrature is optimally set and can be maintained in the optimal condition in spite of drifts in the DC biases of the modulator 1010.

Finally, the working process of the ABC controller unit 1023 is explained. First, during a duration T1, the low frequency dither is distributed to the power DAC 1002, generating the four level signal for the I MZM of the modulator 1010. During this duration, the low frequency dither is not distributed to the Power DAC 1003. Moreover, the feedback of the control units 1050 and 1060 are turned off, which means that the DC bias generated by the control units 1050 and 1060 is kept constant. During the duration T1, the control unit 1040 generates a DC bias in order to maximize its internal feedback signal, as explained with the transmitter 400 of FIG. 4. After the duration T1, the feedback of the control unit 1040 is turned off, which means that the DC voltage generated by 1040 is kept constant. Then during the duration T2, the low frequency dither is distributed to the power DAC 1003, generating the four level signal for the Q MZM of the modulator 1010. During this duration, the low frequency dither is not distributed to the Power DAC 1002. Moreover, the feedback of the control units 1040 and 1060 are turned off, which means that the DC bias generated by 1040 and 1060 is kept constant. During the duration T2, the control unit 1020 generates a DC bias in order to maximize its internal feedback signal, as explained with the transmitter 400 of FIG. 4. After the duration T2, the feedback of the control unit 1050 is turned off, which means that the DC voltage generated by the control unit 1050 is kept constant. Then during the duration T3, the low frequency dither is distributed to the power DAC 1002 and 1003. Moreover, the feedback of the control units 1040 and 1050 are turned off, which means that the DC bias generated by 1040 and 1050 is kept constant. During the duration T3, the control unit 1063 generates a DC bias in order to keep the output of the band pass filter 1061 according to the curve of FIG. 11. The control unit 1023 produces cycles wherein each of the sequences the duration T1, T2 and T3 are performed at least once.

Alternatively, the low frequency dither signal is distributed to both 1002 and 1003 during the duration T1 and T2, as well as the duration T3.

According to the present invention, the ABC circuit 1020 controls the three DC biases of the IQ modulator 1010, which sets and maintains the IQ modulator 1010 in the optimal conditions. Moreover, the QAM transmitter 1000 does not have additional signal degradation due to the usage of low frequency dither signal to control the DC biases of the modulator 1010.

The present invention enables to control an IQ modulator, emitting a lightwave signal modulated according to QAM format, with a low frequency dither signal and to avoid the degradation of signal quality caused by said dither signal. Moreover, the implementation of the present invention is possible with simple off the shelf electronics, therefore it is cost effective. The present invention can be implemented with little footprint, therefore it is small sized.

Third Exemplary Embodiment

Figure 12:
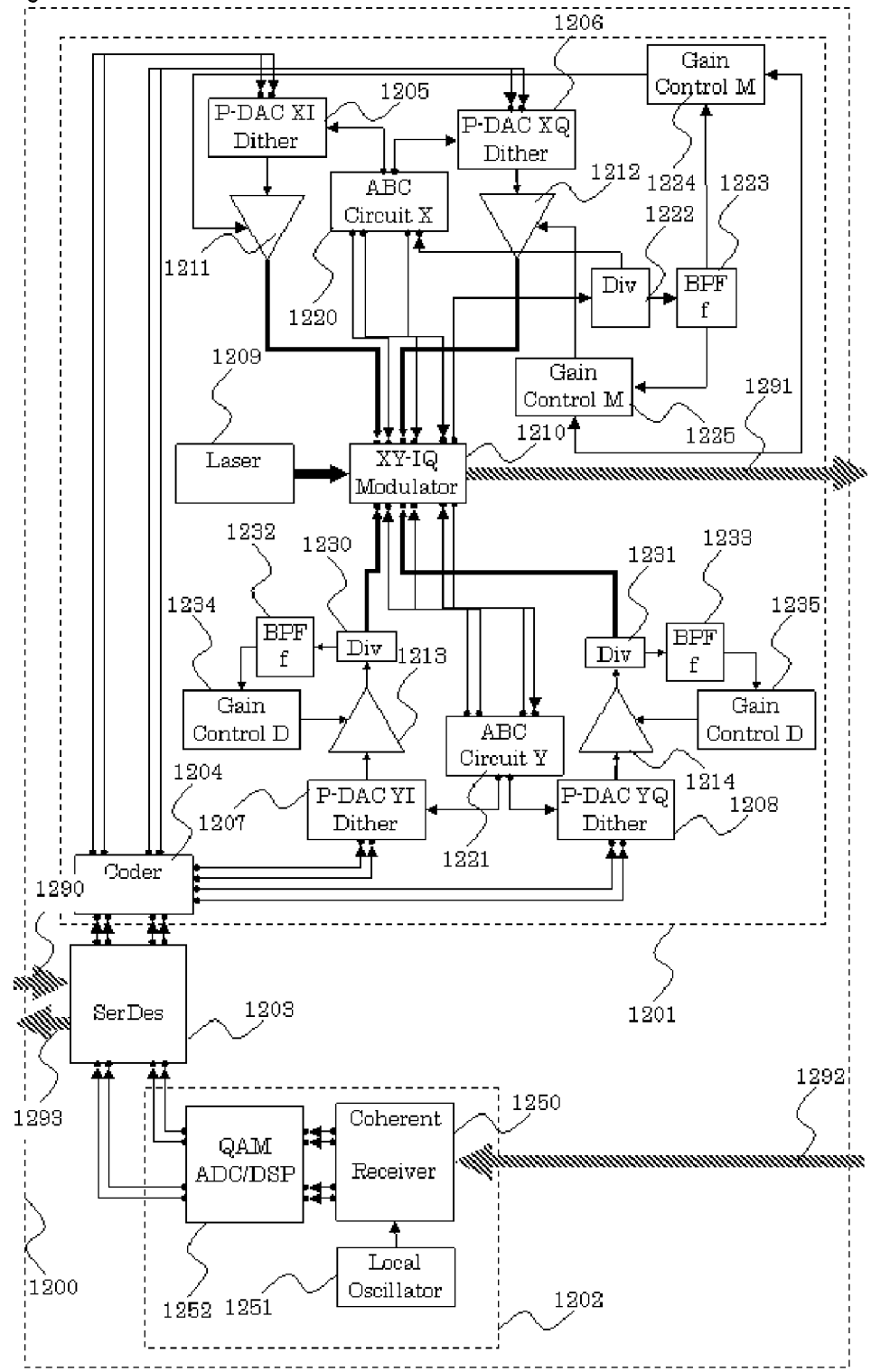
FIG. 12 is a schematic representation of a transponder according to another exemplary embodiment of the present invention.

FIG. 12 is a schematic representation of an optical transponder implementing the present invention. The transponder 1200 is provided with an optical transmitter 1201, which emits a lightwave signal 1291 accordingly to the data bit stream 1290 provided to the transponder. 1200 also features an optical receiver 1202, which receives the modulated lightwave signal 1292 and demodulates it to provide the data bit stream 1293. The transponder 1200 has a serializer-deserializer 1203, which reorganize the stream 1290 to provide data to be modulated by the transmitter 1201. The serializer-deserializer 1203 also receives the data received by 1202 and serializes it into the bit stream 1293. The serializer-deserializer 1203 can also perform coding, decoding and error correction operations. The transmitter 1201 emits lightwave signal with modulation format of polarization multiplexed (PM-) 16QAM and a baud rate of 32 Gbaud, therefore a bit rate of 256 Gb/s. In the same manner, the receiver 1202 receives 256 Gb/s PM-16QAM signal.

The receiver 1202 features a coherent receiver 1250, which consists of a polarization diversity 90 degree hybrid, four balanced detectors and subsequent linear amplifiers, which are not detailed under the coherent receiver 1250. The coherent receiver 1250 mixes the received signal 1292 with the light of local oscillator 1251 in a coherent detection scheme. The received signal from the coherent receiver 1250 is digitalized with four analog to digital converters integrated in the DSP chip 1252. The DSP 1252 compensates for distortions and impairments encountered by the received signal 1292, performs polarization demultiplexing, carrier phase and offset compensation and demodulates the received signal.

The transmitter 1201 is equipped with a coder 1204, which generates 8 data lanes, allocated to 2 bit coded the I and Q data channels of each X and Y polarization. 4 Power DAC 1205, 1206, 1207 and 1208 are identical to the devices described with 500 on FIG. 5. Each of them combines adds low frequency sine signal provided by the ABC circuits 1220 and 1221 to two binary signals provided by 1204, with the phase of the low frequency dither signal changing with respect to the level of the binary signal. The two binary signal with imprinted low frequency dither signal are combined into a four level electrical signal. The ABC circuits 1220 and 1221 are identical to the circuit 1020 of FIG. 10. The multilevel electrical signal is amplified with the drivers 1211, 1212, 1213 and 1214. These drivers feature a function of gain control and are adjusted so that their output have an amplitude of 2*Vpi, where Vpi is defined from the polarization multiplexed IQ modulator 1210. The modulator 1210 includes two IQ modulators similar to the modulator 1010 of FIG. 10, which modulate two lightwave carriers tapped from the same input provided by the laser 1209, rotate one of the lightwave signals and combine them in a polarization multiplexing scheme. The modulator 1210 features two integrated PD, one for each polarization. The three DC biases of the X polarization IQ modulator are controlled with the ABC circuit 1220 and the three DC biases of the Y polarization IQ modulator are controlled with the ABC circuit 1221. Moreover, according to the present invention, controlling the DC biases based on a low frequency dither signal does not cause any degradation of the quality of the signal 1291.

Furthermore, the amplitudes of the output signals of the drivers 1211, 1212, 1213 and 1214 are susceptible to vary depending on the ambient temperature or on the ageing of the drivers. In order to avoid, additional signal degradation due to the change of the output amplitude of the drivers, the gain of said driver is controlled by feedback, relying on the present invention. The transmitter 1201 features two sorts of feedback to control the gain of the drivers, one per polarization. Alternatively, a unique feedback scheme may be implemented to control the gain of all drivers of all polarizations.

First, on the X polarization, the monitor signal provided by the integrated PD of the modulator 1210 is split with the divider 1222. One of the output of 1222 is used by the ABC circuit 1220. The other one passes through a band pass filter 1223 centered on the low frequency f, which is equal to the low frequency generated by the ABC circuit 1220. The output of the band pass filter 1223 is split and each of the split output is provided to identical gain control units 1224 and 1225. The output of the band pass filter 1223 is plot on the characteristics curved 1301 of FIG. 13. The curve 1301 has a maximum for the output voltage of the driver equal to 2*Vpi, which is the optimal condition for the driving signal. According to this characteristics, the curve 1301, the control units 1224 and 1225 controls the gain of the respective drivers 1211 and 1212 in order to maximize the output of the band pass filter 1223. It may be advantageous to link the control units 1224 and 1225 as the use the same monitor signal, in order to stop one of the units while one is optimizing the monitor signal, and stop the unit to maximize the monitor signal with the other unit sequentially, repeating this cycle to optimize the gain of the drivers 1211 and 1212 continuously. According to the present invention, the gain of the drivers of the transmitter 1203 is controlled to the optimal conditions using a low frequency dither signal, without causing any degradation to the quality of the emitted signal.

Then, on the Y polarization, the output of the drivers 1213 and 1214 is respectively tapped with the dividers 1230 and 1231. Alternatively, the divider 1230 and 1231 can be integrated in the drivers 1213 and 1214 as a monitoring function. The tapped output of the dividers 1230 and 1231 are filtered by the respective band pass filters 1232 and 1233 which are centered on the low frequency f, equal to the low frequency generated by the ABC circuit 1221. The output of the band pass filter 1233 is plot by the curve 1302 of FIG. 13. As the curve 1302 varies monotonically with the output voltage of the drivers, the control unit 1235 controls the gain of the driver 1214 in order to maintain the monitor signal provided by the band pass filter 1233 at a constant value. In the case of the optimal value of 2*Vpi, the monitor signal is kept constant at 97 mV by the control unit 1235, by varying the gain of the driver 1214. Identically, the control unit 1234 maintains the value of the output of the band pass filter 1232 constant by controlling the gain of the driver 1213. According to the present invention, the gain of the drivers of the transmitter 1203 is controlled to the optimal conditions using a low frequency dither signal, without causing any degradation to the quality of the emitted signal.

Figure 13:
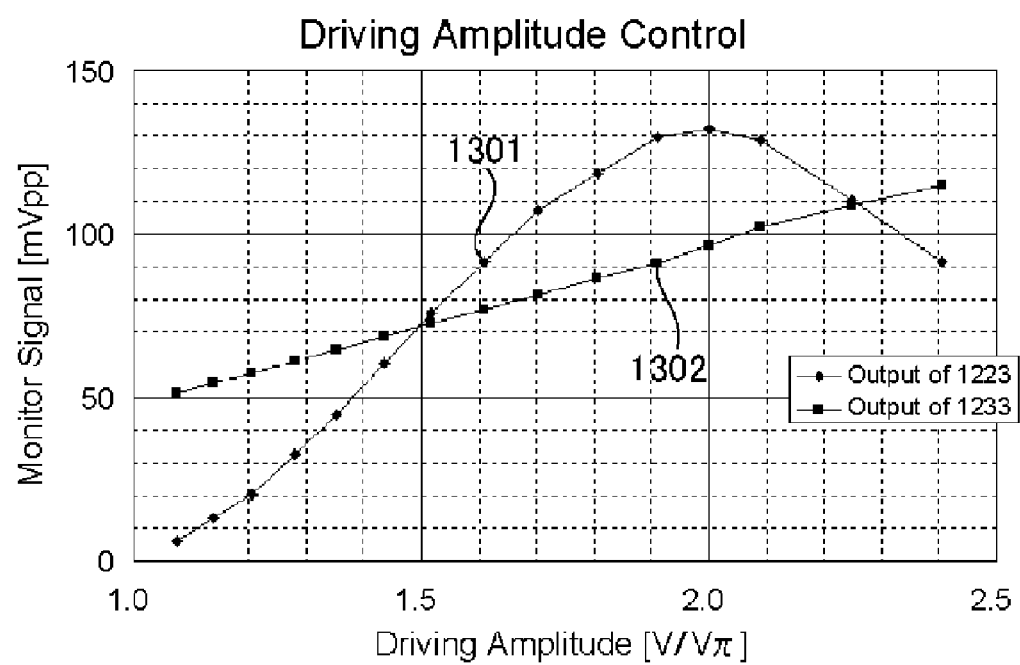
FIG. 13 is a waveform chart of the monitor signals used in the transmitter of FIG. 12.

FIG. 13 is a plot of the characteristics curves of the monitor signals generated by the filters 1223 and 1233 of FIG. 12 and used by the transmitter 1201 of FIG. 12 to control the gain of the drivers of said transmitter.

The present invention enables to control an IQ modulator, emitting a lightwave signal modulated according to QAM format, with a low frequency dither signal and to avoid the degradation of signal quality caused by said dither signal. Moreover, the implementation of the present invention is possible with simple off the shelf electronics, therefore it is cost effective. The present invention can be implemented with little footprint, therefore it is small sized. Finally, the present invention enables to control the gain of the driver amplifiers without causing additional damage.

Fourth Exemplary Embodiment

Figure 14:
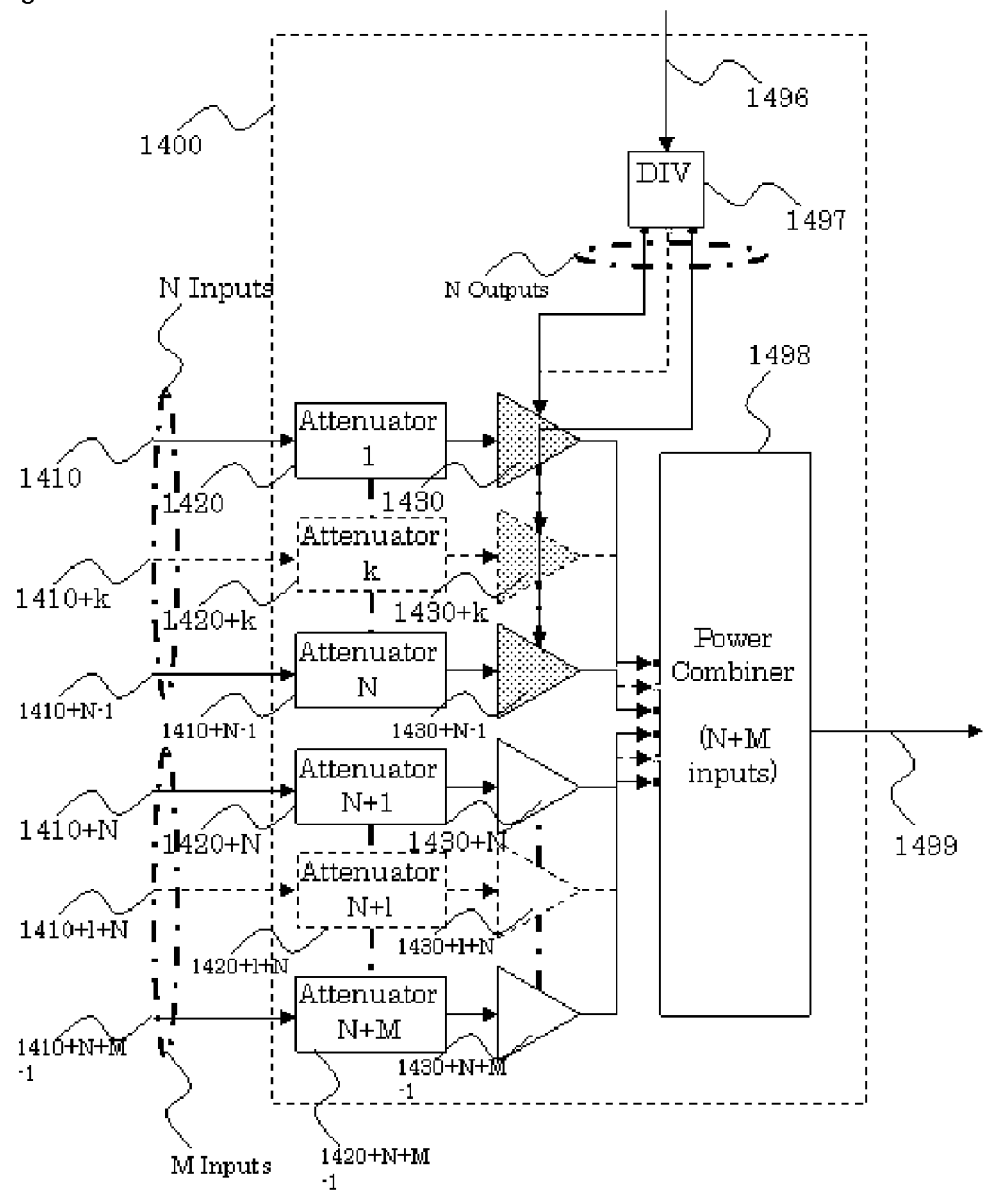
FIG. 14 is a schematic representation of a power DAC used to generate multilevel signals according to the invention.

FIG. 14 is the schematic representation of the power DAC 1400. The power DAC 1400 has N+M inputs, where N and M are two integers, with N 3 2 and M3 0. The power DAC 1400 transforms N+M binary electrical signals into a multilevel signal with 2^(N+M) levels. The N first high speed binary signal inputs, noted by the consecutive numerals starting from the input 1410 are attenuated by N respective attenuators noted by the consecutive numerals starting from the attenuator 1420. The values of the attenuators may be different and are designed to obtain the desired spacing between levels of the signal 1499. After said attenuators, the N respective signals pass through N respective amplifiers circuits noted by the consecutive numerals starting from the amplifier 1430. The amplifiers may be chosen as identical to the amplifier circuit 600 of FIG. 6, the amplifier circuit 700 of FIG. 7, or the amplifier circuit 800 of FIG. 8. The low frequency sine wave 1496 of frequency f is split into N signals by the divider 1497, to be distributed to the N amplifier circuits noted by the consecutive numerals from 1430. Said amplifiers amplify their respective inputs and add a low frequency dither signal at the frequency f, which phase changes with the level of the input high speed binary signal.

The following M inputs for high speed binary signals noted with consecutive numerals from 1410+N also pass through M respective attenuators noted with consecutive numerals from 1420+N. Said attenuators have proper attenuation values chosen accordingly to the desired spacing between levels of the signal 1499. The respective outputs of said attenuators are amplified by M respective amplifiers noted with consecutive numerals from 1430+N. However, the M amplifiers do not imprint low frequency dither signals. The power combiner 1498 combines the respective outputs of the N amplifiers noted from 1430, which have a low frequency dither signal imprinted, and the respective outputs of the M next amplifiers noted from 1430+N, which do not have an imprinted low frequency dither signal. The signal 1499 output by 1498 is a 2^(N+M) level signal which has a low frequency dither signal component, which amplitude depends on the level of the signal.

Considering the power DAC 1400 as a generalization of the power DAC 500, the power DAC 500 is obtained by choosing N=2 and M=0 for 1400.

Figure 15:
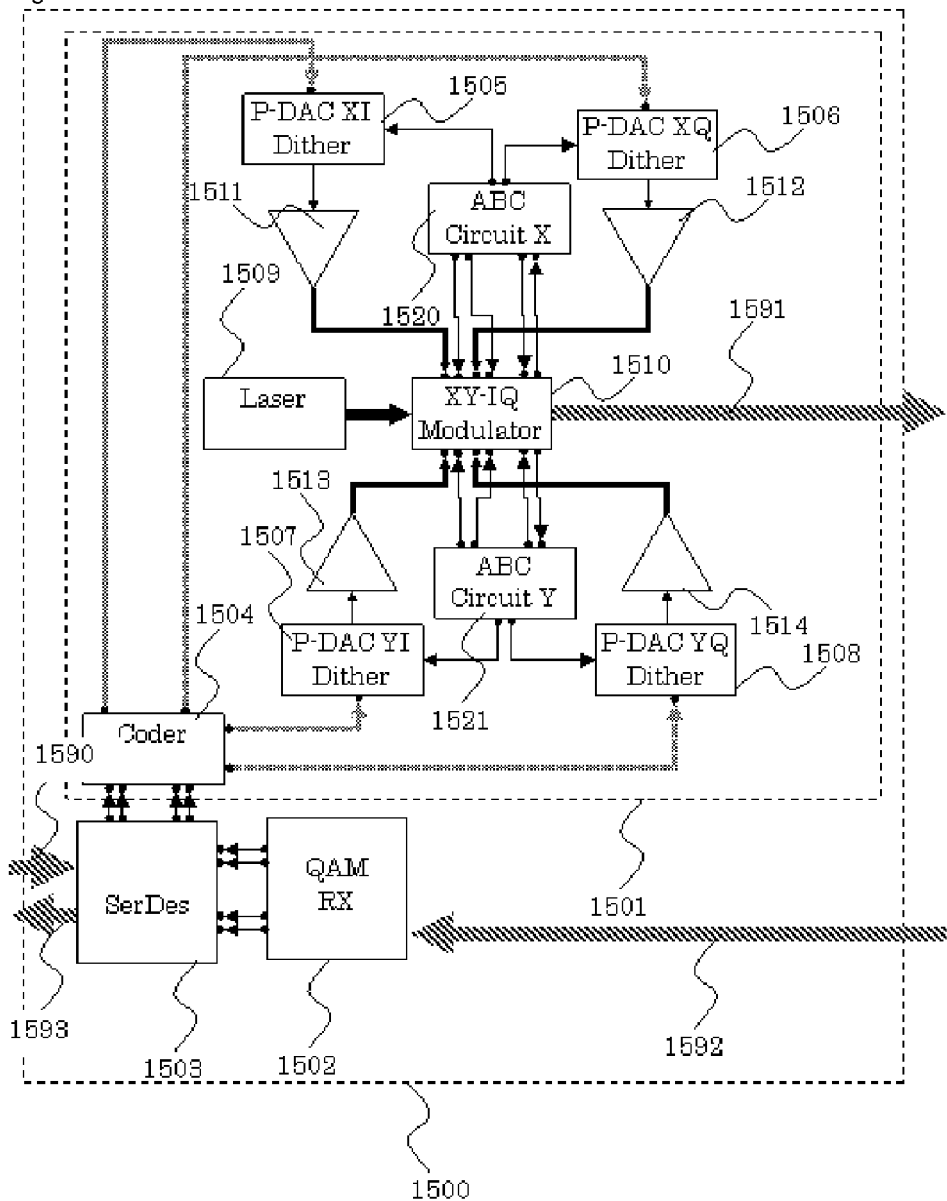
FIG. 15 is a schematic representation of a transponder according to another exemplary embodiment of the present invention.

FIG. 15 is a schematic representation of an optical transponder implementing the present invention. The transponder 1500 is provided with an optical transmitter 1501, which emits a lightwave signal 1591 accordingly to the data bit stream 1590 provided to the transponder. 1500 also features an optical receiver 1502, identical in structure to the receiver 1202 of FIG. 12. The receiver 1502 receives the modulated lightwave signal 1292 and demodulates it to provide the data bit stream 1593. The serializer-deserializer 1503 is identical to the serializer-deserializer 1203 of FIG. 12. The transmitter 1501 is equipped with four power DAC 1505, 1506, 1507, 1508 identical to the power DAC 1400 of FIG. 14. The power DAC transform (N+M) binary signals into a 2^(N+M) level signal with a low frequency dither signal imprinted on it. The coder 1504, generates 4*(N+M) data lanes, allocated to (N+M) bits coded the I and Q data channels of each X and Y polarization of the transmitter 1501. The ABC circuits 1520 and 1521 are identical to the circuit 1220 of FIG. 12. The ABC circuits 1520 and 1521 provide a low frequency sine wave of frequency f to imprint a corresponding dither signal on the multilevel signals generated by the power DAC 1505, 1506, 1507 and 1508. The multilevel electrical signals are amplified with the drivers 1511, 1512, 1513 and 1514. The modulator 1510 is identical to the modulator 1210 of FIG. 12. The baud rate of the transponder 1500 is 32 Gbaud.

First, the integers N and M defining the power DAC 1505, 1506, 1507 and 1508 are chosen as N=2 and M=1. Attenuators in the power DAC are set as 2 dB, 8 dB and 0 dB with respect to the order of the inputs of FIG. 14. The signal emitted by the transmitter 1501 is 32 Gbaud PM-64QAM, therefore with a bit rate of 512 Gb/s. Accordingly, the optical receiver 1502 receives and demodulates PM-64QAM signal. The ABC circuits 1520 and 1521 control the 6 DC biases of the modulator 1510. According to the present invention, the DC biases are correctly set through a low frequency dither signal imprinted on the high speed driving signal and the signal degradation caused by said low frequency dither signal is reduced.

In a second implementation of the present invention, the integers N and M defining the power DAC 1505, 1506, 1507 and 1508 are chosen as N=3 and M=0. Attenuators in the power DAC are set as 0 dB, 2 dB and 8 dB with respect to the order of the inputs of FIG. 14. The signal emitted by the transmitter 1501 is 32 Gbaud PM-64QAM, therefore with a bit rate of 512 Gb/s. Accordingly, the optical receiver 1502 receives and demodulates PM-64QAM signal. The ABC circuits 1520 and 1521 control the 6 DC biases of the modulator 1510. According to the present invention, the DC biases are correctly set through a low frequency dither signal imprinted on the high speed driving signal and the signal degradation caused by said low frequency dither signal is reduced.

Figure 16A:
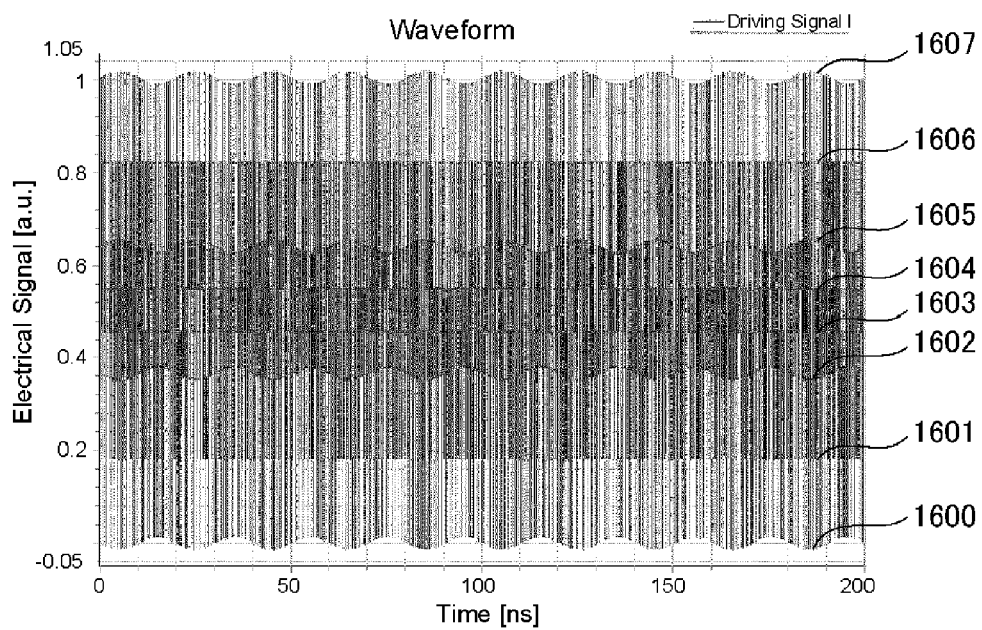
FIG. 16A is a waveform chart of the multilevel signal generated by the power DAC of FIG. 14 within the transponder of FIG. 15.

FIG. 16 summarizes simulation results based on the transponder of FIG. 15. FIG. 16A displays the simulated waveform chart of output for the power DAC 1505 of FIG. 15 for the case where N=2 and M=1. The output signal is a 8-level signal generated with the 3 binary signals generated by the coder 1504. The eight signal levels are marked as 1600, 1601, 1602, 1603, 1604, 1605, 1606 and 1607. As enabled by the present invention, the amplitude of the imprinted low frequency dither signal depends on the level. In this configuration, the levels 1601, 1603, 1604 and 1606 have no dither signal present, while 1600, 1602, 1605 and 1607 have a low frequency dither signal.

Figure 16B:
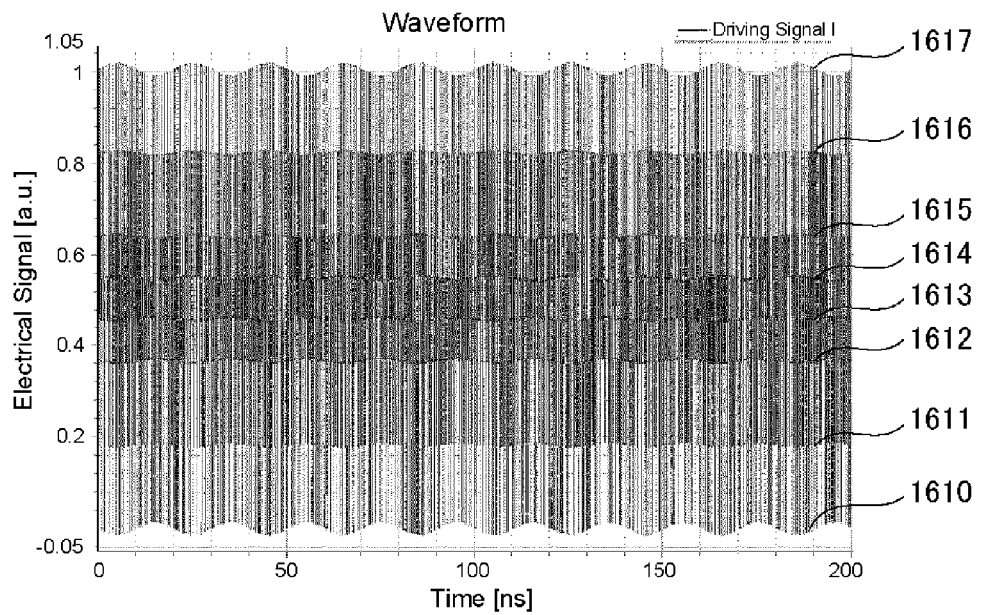
FIG. 16B is a waveform chart of the multilevel signal generated by the power DAC of FIG. 14 within the transponder of FIG. 15.

FIG. 16B displays the simulated waveform chart of output for the power DAC 1505 of FIG. 15 for the case where N=3 and M=0. The output signal is a 8-level signal generated with the 3 binary signals generated by the coder 1504. The eight signal levels are marked as 1610, 1611, 1612, 1613, 1614, 1615, 1616 and 1617. As enabled by the present invention, the amplitude of the imprinted low frequency dither signal depends on the level. In this configuration, the outer levels 1610 and 1617 have maximal amplitude for the low frequency dither signal whereas the inner levels 1611, 1612, 1613, 1614, 1615 and 1616 have reduced dither signal amplitudes.

Figure 16C:
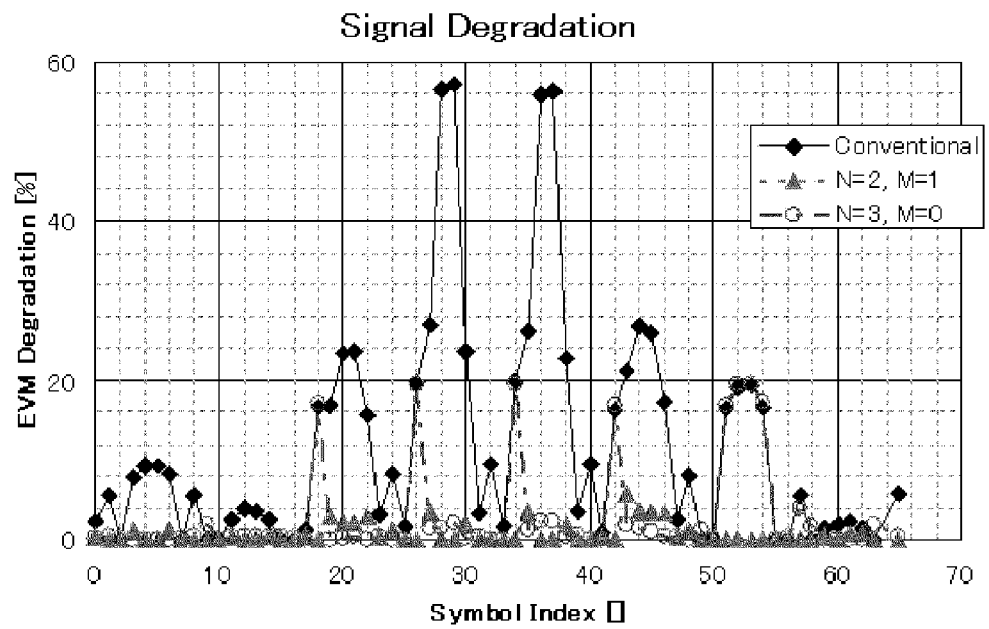
FIG. 16C is a histogram summarizing the quality of the signal generated from FIG. 16A and FIG. 16B.

FIG. 16C summarized the signal degradation for various types of transmitters detailed by emitted symbol. The symbol index is fixed arbitrarily without any meaning on the supposed data mapping operated by the transmitter. By pure convention, the order is fixed in the same manner as for FIG. 3D, from left to right and bottom to up on the constellation map of the emitted signal. The plotted value on FIG. 16C is the difference between the EVM of the studied simulation and the EVM of the transmitter set ideally and the dither signals and ABC circuits turned off. The conventional convention corresponds to the dither signal imprinted directly on the DC biases, in the manner of FIG. 1. The case N=2/M=1 corresponds to the configuration plot on FIG. 16A. The case N=3/M=0 corresponds to the configuration plot on FIG. 16B. The conventional case illustrates the fact that on central symbols, dithers used for ABC control cause important degradation on the emitted signals. In the case of the present invention with N=3 and M=0, the degradation is kept below 20% for all symbols, which is an improvement from the conventional method. In the case of the present invention with N=2 and M=1, the degradation is kept below 8% for all symbols, which is an improvement from the conventional method.

The present invention enables to control an IQ modulator, emitting a lightwave signal modulated according to QAM format, with a low frequency dither signal and to avoid the degradation of signal quality caused by said dither signal. Moreover, the implementation of the present invention is possible with simple off the shelf electronics, therefore it is cost effective. The present invention can be implemented with little footprint, therefore it is small sized.

It is apparent that the present invention is not limited to the above described embodiments, which can be modified and changed without departing from the scope of the invention.

INDUSTRIAL APPLICABILITY

This invention can be applied to an optical communication system which utilizes multi-level modulation schemes.

REFERENCE SIGNS LIST 100, 400, 1000, 1201, 1501 optical transmitters
104, 105, 220, 230, 404, 405, 520, 530, 610, 1004, 1005, 1211, 1212, 1213, 1214, 1430, 1511, 1512, 1513, 1514 electrical amplifiers
110, 410, 1010, 1210, 1510 IQ modulator
120, 420, 1020 ABC circuit
140, 440, 1060 Control units
198, 498, 1098, 1290, 1293 binary data streams
199, 499, 1099, 1291, 1292, 1591, 1592 Modulated lightwave signals
200, 500, 1400 Power DAC
201, 202, 501, 502, 601, 603, 701, 703, 801, 802, 804, 805, 1410 Binary electrical signals
203, 503, 1499 Multilevel electrical signal
240 Power divider
241, 242, 243 Resistors
301, 302, 303, 304, 305 Point on the curve of transmission characteristics
310 to 325 Symbols on the constellation map of 16QAM signals
330, 331, 332, 333, 900, 901, 902, 903, 910, 911, 912, 913, 1600, 1601, 1602, 1603, 1604, 1605, 1606,
1607, 1610, 1611, 1612, 1613, 1614, 1615, 1616, 1617 levels of electrical signals
504, 602, 702, 803, 1496 low frequency electrical sine signal
600, 700, 800 Amplifier circuits
609, 708, 709, 809 Fixed voltages
710, 711 Field Effect Transistors
810, 811 Transistors
620, 621, 622 Condensers
730, 731, 830, 831 Resistors
920, 921, 1301, 1302 Characteristic curve of monitor signal
1202, 1502 optical receiver
1200, 1500 optical transponder

The invention claimed is:

1. An optical output device comprising:
  a combiner to combine a plurality of binary electrical signals and add a dither electrical signal having a frequency lower than a bit rate of the binary electrical signals to the binary electrical signals;
  an adjuster to adjust an amplitude of the binary electrical signals; and
  a modulator to modulate an optical signal based on the binary electrical signals, wherein the dither electrical signal has a phase based on a value of the binary electrical signals and that is susceptible to change based on each of a plurality of bits of the binary electrical signals.

2. The optical output device of claim 1, further comprising:
a generator to generate the dither electrical signal.

3. The optical output device of claim 1, further comprising:
a monitor to generate an electrical signal proportional to the optical signal; and
a band pass filter to output the dither electrical signal from the electrical signal.

4. An optical module comprising:
an optical input device to generate an electrical signal from a first optical signal; and
an optical output device to generate a second optical signal, comprising:
  a combiner to combine a plurality of binary electrical signals and add a dither electrical signal having a frequency lower than a bit rate of the binary electrical signals to the binary electrical signals;
  an adjuster to adjust an amplitude of the binary electrical signals;
  a plurality of modulators to modulate the second optical signal based on the binary electrical signals to which the dither electrical signal have been added at different frequencies.

5. A device comprising:
a combiner to combine a plurality of binary electrical signals;
an adjuster to adjust an amplitude of the binary electrical signals;
an adder to add a dither electrical signal having a frequency lower than a bit rate of the binary electrical signals to the binary electrical signals to generate a multilevel electrical signal,
wherein the dither electrical signal is null at least one level of a plurality of levels of the multilevel electrical signal.

6. A method comprising:
generating a multilevel electrical signal by:
  combining a plurality of electrical signals, the multilevel electrical signal to drive a modulator of an optical transmitter;
  adding a dither electrical signal having a frequency lower than a bit rate of the binary electrical signals on the binary electrical signals; and
modulating an optical signal based on the binary electrical signals,
wherein the dither electrical signal has a phase based on a value of the binary electrical signals and that is susceptible to change based on each of a plurality of bits of the binary electrical signals.

7. The method of claim 6, further comprising:
controlling the optical transmitter based on a component of the optical signal at the frequency.

8. The method of claim 7, further comprising:
controlling a bias of the modulator based on the component of the optical signal at the frequency.

9. The method of claim 6, further comprising:
controlling an output voltage of a driver amplifier for the multilevel electrical signal base based on the component of the optical signal at the frequency.

10. The method of claim 6, wherein the modulator is a particular modulator and the dither electrical signal is a particular dither electrical signal,
wherein the optical transmitter has a plurality of modulators including the particular modulator, each modulator to generate the optical signal, and
wherein a plurality of dither electrical signals including the particular dither electrical signal having the frequency each control a corresponding modulator of the modulators.

11. The method of claim 6, wherein the dither electrical signal is null at least one level of a plurality of levels of the multilevel electrical signal.

12. The method of claim 6, wherein modulating the optical signal comprises using a polarization multiplexed quadrature amplitude modulation (QAM) format.

13. The method of claim 12, wherein the polarization multiplexed QAM format is a polarization multiplexed 64QAM format,
wherein the multilevel electrical signal has eight levels,
wherein generating the multilevel electrical signal further comprises combining three binary electrical levels,
and wherein the method further comprises:
  controlling a quadrature angle and direct current (DC) biases of a plurality of Mach-Zehnder modulators nested within an in-phase and quadrature (IQ) modulator based on the optical signal.

14. The method of claim 12, wherein the polarization multiplexed QAM format is a polarization multiplexed 16QAM format,
wherein the multilevel electrical signal has four levels,
wherein generating the multilevel electrical signal further comprises combining two binary electrical levels,
and wherein the method further comprises:
  controlling a quadrature angle and direct current (DC) biases of a plurality of Mach-Zehnder modulators nested within an in-phase and quadrature (IQ) modulator based on the optical signal.

* * * * *